(12) United States Patent
Nalim

(10) Patent No.: US 6,845,620 B2
(45) Date of Patent: Jan. 25, 2005

(54) ROTARY EJECTOR ENHANCED PULSED DETONATION SYSTEM AND METHOD

(75) Inventor: Mohamed Razi Nalim, 6047 Polonius Ct., Indianapolis, IN (US) 46254

(73) Assignee: Mohamed Razi Nalim, Indianapolis, IN (US)

(*) Notice: Subject to any disclaimer, the term of this patent is extended or adjusted under 35 U.S.C. 154(b) by 29 days.

(21) Appl. No.: 10/188,938

(22) Filed: Jul. 3, 2002

(65) Prior Publication Data

US 2003/0079713 A1 May 1, 2003

Related U.S. Application Data

(60) Provisional application No. 60/303,359, filed on Jul. 6, 2001.

(51) Int. Cl.[7] ............................................... F02C 3/02
(52) U.S. Cl. ...................................... 60/776; 60/39.45
(58) Field of Search ................................ 60/776, 39.45

(56) References Cited

U.S. PATENT DOCUMENTS

| | | |
|---|---|---|
| 2,399,394 A | 4/1946 | Seippel |
| 2,705,867 A | 4/1955 | Lewis |
| 3,401,676 A | 9/1968 | Wanzenberg |
| 3,809,020 A | 10/1974 | Takitani |
| 3,931,553 A | 1/1976 | Stich et al. |
| 4,240,394 A | 12/1980 | Lay |
| 4,500,260 A | 2/1985 | Mayer et al. |
| 4,646,704 A | 3/1987 | Gora et al. |
| 4,719,746 A | 1/1988 | Keller |
| 4,744,213 A | 5/1988 | El-Nashar |
| 4,860,547 A | 8/1989 | Maldague |
| 4,887,942 A | 12/1989 | Hauge |
| 4,924,637 A | 5/1990 | Ikimi et al. |
| 5,051,064 A | 9/1991 | Konert |
| 5,154,583 A | 10/1992 | Althaus |
| 5,197,276 A | 3/1993 | Keller |
| 5,267,432 A | 12/1993 | Paxson |
| 5,274,994 A | 1/1994 | Chyou et al. |
| 5,297,384 A | 3/1994 | Paxson |
| 5,313,785 A * | 5/1994 | Althaus et al. ............ 60/39.45 |
| 5,338,158 A | 8/1994 | Hauge |
| 5,339,635 A | 8/1994 | Iwai |
| 5,381,653 A | 1/1995 | Althaus |
| 5,513,489 A | 5/1996 | Bussing |
| 5,522,217 A | 6/1996 | Zauner |
| 5,894,719 A | 4/1999 | Nalim |
| 5,916,125 A | 6/1999 | Snyder |
| 6,449,939 B1 * | 9/2002 | Snyder ....................... 60/776 |
| 6,460,342 B1 | 10/2002 | Nalim |

FOREIGN PATENT DOCUMENTS

| | | |
|---|---|---|
| WO | WO00/68566 | 11/2000 |
| WO | WO 03/023203 A2 | 3/2003 |

OTHER PUBLICATIONS

Kentfield, J.A.C., "Circumferential Cell–Dividers in Wave–Rotors," 34th AiAA/ASME/SAE/ASEE Joint Propulsion Conference & Exhibit, Cleveland, OH, AIAA98–3397, Jul. 13–15, 1998.

(List continued on next page.)

Primary Examiner—Charles G. Freay
(74) Attorney, Agent, or Firm—Donald R. Piper, Jr., Esq.; Dann, Dorfman, Herrell & Skillman

(57) ABSTRACT

A rotary ejector enhanced wave rotor pulsed detonation (WRPDE) engine and method are provided. The rotary-ejector-WRPDE includes a housing, one or more inlet ports in the housing, and a rotor mounted within the housing. The rotor includes a plurality of shrouded forward combustion passages in which detonative combustion occurs. Each forward combustion passage has an inlet end for communication with the inlet port. The rotor also includes a plurality of rear combustion passages which are in gaseous communication with the forward combustion passages. The rotor further includes a plurality of transitional combustion passages which join the forward combustion passages to the rear combustion passages and communicate with a source of bypass gas to provide a rotary ejector.

106 Claims, 24 Drawing Sheets

OTHER PUBLICATIONS

Nalim, N. Razi, "Pulse Combustion and Wave Rotors for High–Speed Propulsion Engines," 8th International Space Planes annm;d Hypersonic Systems and Technologies Conference, Norfolk, VA, Apr. 27–30, 1998.

Nalim, M. Razi, "Numerical Study of Stratified Charge Combustion in Wave Rotors," 33rd AIAA/ASME/SAE/ASEE Joint Propulsion Conference and Exhibit, Seattle, WA, AIAA–97–3141, Jul. 6–9, 1997.

Bussing, T.R.A., "A Rotary Valve Multiple Pulse Detonation Engine (RVMPDE)", 31st AIAA/ASME/SAE/ASEE Joint Propulsion Conference and Exhibit, San Diego, CA, AIAA95–2577, Jul. 10–12, 1995.

Goldstein, et al., "Ideal Performance of Valved–Combustors and Applicability to Several Engine Types," Trans. of the American Society of Mechancial Engineers, 80, Jul. 1958, pp. 1027–1036.

Nalim, et al., "A Numerical Investigation of Premixed Combustion in Wave Rotors," 41st Gas Turbine and Aeroengine Congress sponsored by the International Gas Turbine Institute of the American Society of Mehanical Engineers, Birmingham, United Kingdom, Jun. 10–13, 1996.

Berchtold, et al., "Supercharging with Comprex. Application and Experience," cite unknown.

Comprex, "The Comprex Pressure Wave Supercharger . . . " Informative advertisement from Comprex AG, CH–5507 Melligen, Switzerland.

Schapker, R.L., "Analysis of a Wave Combustor Designed for Time–Steady Inlet and Discharge Conditions," AGT—Technical Information Series No. DF58AGT387, Flight Propulsion Laboratory Department, Aircraft Gas Turbine Division, General Electric, Cincinnati, Ohio, Jun., 1958.

Nalim, M.R., "Assesment of Combustion Modes for Internal Combustion Wave Rotors," Journal of Engineering for Gas Turbines and Power, Apr. 1999, vol. 121, pp. 265–271.

Vickers Catalog, "Comprex, the pressure wave supercharger" advertisement for Model CX 93.

Tabaczynski, R., "Turbulence and Turbulent Combustion in Spark–Ignition Engines" Prog. Energy Combust. Sci., vol. 2, pp. 143–165 (1976).

Biligin, M. et al., "Ignition and Flame Propagation Process with Rotating Hote Jets in a Simulated Wave Engineer Test Cell" 34th AIAA/ASME/SAE/ASEE Joint Propulsion Conference & Exhibit, Cleveland, OH AIAA–98–3399, Jul. 13–15, 1998.

Welch, G., "Wave–Rotor–Enhanced Gas Turbine Engines" Journal of Engineering for Gas Turbines and Power, vol. 119 (Apr. 1997).

Nalim, M.R., "Wave Cycle Design for Wave Rotors Engines with Limited Nitrogen Oxide Emissions" Cornell University, 1994.

* cited by examiner

ROTARY EJECTOR ENHANCED PULSED DETONATION SYSTEM AND METHOD

RELATED APPLICATIONS

This application claims the benefit of Provisional Application Ser. No. 60/303,359, filed on Jul. 6, 2001, the entire contents of which are incorporated herein by reference.

FIELD OF THE INVENTION

The present invention relates generally to a rotary ejector for use with a wave rotor pulsed detonative engine.

BACKGROUND OF THE INVENTION

Pulsed detonation engines (PDE's) are non-steady combustion devices that typically produce intermittent high-momentum jets of exhaust separated by longer periods of dribbling or no outflow. Such temporal unsteadiness can pose difficulties in many applications. In addition, reliable detonation in such engines requires the use of highly energetic near-stoichiometric mixtures. The use of such mixtures creates combustion product temperatures and detonation-induced velocities that are excessive for most applications. As a result there are several distinct problems that must be addressed in the design of pulsed detonation engines. The severity of each problem depends on the particular PDE configuration, combustion method, and application, and in particular, on whether the output flow is used directly for jet propulsion or is used to drive a turbine.

A first such problem is that the outflow peak temperature, mass-average temperature, peak velocity, and mass-average velocity are too high for many practical applications. Excessive velocity and temperature in the outflow create low propulsive efficiency, limited thrust, and limited device lifetime.

In a gas generator PDE device designed to power a turbine, it is undesirable to have a non-steady or non-uniform velocity turbine flow. Also, gas must be diluted to an acceptable turbine temperature. In a thrust device, a non-steady or non-uniform jet or a high velocity jet has lower propulsive efficiency than a steady uniform jet or a lower velocity jet with the same total kinetic energy. In addition, high velocity jets also produce excessive noise, and high temperature jet engines may be vulnerable to thermal-signature tracking missiles.

Pulsed detonation engine configurations have been proposed to address the unsteadiness problem by using multiple detonation tubes that breathe and fire sequentially and provide a combined inflow and outflow that is temporally more steady than for a single tube. However, these configurations often have limitations that include: the need for dedicated feed and ignition hardware for each tube; flow stagnation in multiple feed distribution exhaust collection ducts; the need for multiple high-repetition detonation initiation devices; the need for complex fast-cycling valving for purging gas, fuel, and oxidant/enrichment; and the need for many pulsing or moving components as well as many parts outside the flow path with significant weight and volume. In addition, stationary tube PDE's have further limitations that include reduced durability based on the need for valves and bearings that transmit thrust. In addition, the noise created by the cyclically loaded parts can pose further problems.

Since pulsed detonation engines have application in important areas such as aircraft and missile propulsion, it is highly desirable to provide a PDE that produces an outflow having velocity, temperature, and outflow characteristics that are compatible with downstream components. In addition, it is desirable to provide such compatibility while minimizing engine losses.

SUMMARY OF THE INVENTION

In accordance with the present invention, a wave rotor pulsed detonation engine (WRPDE) is provided having a rotary ejector for reducing excessive outflow temperature and velocity to provide a rotary-ejector-WRPDE. The engine provides improved propulsive efficiency and control of gas temperature.

A WRPDE creates motive thrust without the need for a compressed air source or a downstream turbine. The WRPDE is an on-rotor combustion device where the combustion process occurs within combustion channels of the rotor. To generate sufficient thrust, the WRPDE creates detonative combustion within the channels of the rotor. The rotary ejector of the WRPDE provides improved efficiency by transferring energy and momentum from a high speed/high-pressure flow stream to a low-pressure stream to augment thrust. This action distributes energy and momentum to a larger mass, resulting in lower overall velocity and greater propulsive efficiency and thrust. In addition, the rotary ejector may also help cool and homogenize a stream of higher temperature while providing pressure equalization. Accordingly, the present invention efficiently harnesses the energy and momentum of the detonation processes to maximize performance.

The rotary-ejector-WRPDE includes a housing, one or more inlet ports in the housing, and a rotor mounted within the housing. The rotor includes a plurality of forward combustion passages in which detonative combustion occurs. Each forward combustion passage has an inlet end for communication with the inlet port. The rotor also includes a plurality of rear combustion passages which are in gaseous communication with the forward combustion passages. The rear combustion passages may be shrouded or unshrouded and may have a radial height greater than the radial height of the forward combustion passages. The rotor may also include a plurality of transitional combustion passages which join the forward combustion passages to the rear combustion passages to provide a rotary ejector. The transitional combustion passages may be partially or completely unshrouded to provide the rotary ejector. In addition, the WRPDE optionally includes a bypass duct. The bypass duct has an outlet end in gaseous communication with the transitional combustion passages.

To promote the creation of detonative combustion, a plurality of separate inlet zones may be provided in the inlet port of the housing for supplying fuel and air mixtures to the inlet end of the forward combustion passages. The inlet zones are circumferentially spaced about the perimeter of the rotor so that the forward combustion passages interact with separate inlet zones sequentially. A fuel injector is provided in selected inlet zones for injecting fuel into each respective zone. Each inlet zone is capable of introducing a different combustible mixture sequentially into a given forward combustion passage as the passage rotates past the respective inlet zone. For example, a first inlet zone may be provided for providing an input of air, without fuel, into the passage to act for example as a buffer in the passage. As the passage in the rotor moves into registry with a second inlet zone, a fuel or fuel mixture may be input into the passage. Additional inlet zones may be provided for successively inputting additional fuel or fuel mixtures which may be different from other fuels or fuel concentrations, into the passage. Another inlet zone, such as the last inlet zone, may input a combustion enhancer or a mixture of fuel and a combustion enhancer into the forward combustion passage proximal to the source of ignition to enhance detonative combustion. Using successive inlet zones results in the stratification of differing concentrations of combustible material within the forward combustion passages.

For the purpose of inputting the optional combustion enhancer into the combustion passage, an enhancement injector for injecting a combustion enhancer into the forward combustion passage may be provided. Preferably, a combustion enhancer such as an oxidant is used in the inlet zone proximate to the igniter. A CPU or electronic control system and motor are optionally provided to control the rates of the rotor rotation, fuel injection, and ignition. After detonation, the combustion materials flow from the forward combustion passage through the transitional and rear passages to an exhaust port in the housing. The passage is successively charged, as desired, to have a mixture highly susceptible to initiation of detonative combustion.

The length of the combustion passages, the circumferential extent of the inlet, bypass, and exhaust ports, the placement of the exhaust and bypass ports relative to the input port, and the rotational speed of the rotor are designed to control the cyclic flow processes, wave processes, and combustion processes to support detonative combustion within the rotary-ejector-WRPDE. The length of the transitional combustion passages, the shape of the transitional combustion passages, the degree of shrouding of the transitional combustion passages, and the relative radial height of the forward, transitional, and rear combustion passages are designed to control the rotary ejector function.

The present invention also provides a method for combusting a material in a pulsed detonation process combined with a non-steady ejector process. The method includes the step of rotating a rotor comprising a plurality of combustion passages so that an inlet of a selected combustion passage is in gaseous communication with a first inlet zone of an inlet port. Air is then drawn into the inlet of the combustion passage from the first inlet zone to form a buffer layer within the combustion passage. The buffer layer inhibits spontaneous combustion of subsequently introduced combustible materials by any hot gases present within the combustion passage. The method also includes the step of rotating the rotor so that the inlet is in gaseous communication with a second inlet zone of the inlet port. Fuel is introduced into the second inlet zone to provide a combustible fuel mixture, and the fuel mixture is drawn into the combustion passage inlet. In a further step, the rotor is rotated so that the inlet is substantially gaseously sealed against a first wall of the engine housing so that the inlet is in communication with an igniter mounted at the first wall. The combustible mixture within the combustion passage is ignited to cause detonative combustion whereby a shock wave is generated traveling from the inlet towards an outlet of the combustion passage. The rotor is then rotated, in a further step, so that the outlet is in gaseous communication with an exhaust port as the shock wave reaches the outlet, whereby an expansion wave is generated traveling from the outlet towards the inlet of the combustion passage. The rotor then is rotated so that an unshrouded intermediate portion of the combustion passage is in gaseous communication with a source of bypass air as the expansion wave reaches the source of bypass air, whereby bypass air is drawn into the combustion passage.

Hence, in accordance with the present invention, a combustion process is provided whereby a pulsed detonation process is combined with a non-steady ejector process through the action of the rotary ejector. The varying radial height of the rotary ejector avoids the need for complex integration of a pulsed detonation device to an ejector device. At the same time, the present invention retains sufficient free design parameters to provide correct matching between the non-steady wave processes of the pulsed detonation cycle and a joiner cycle of the rotary ejector.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
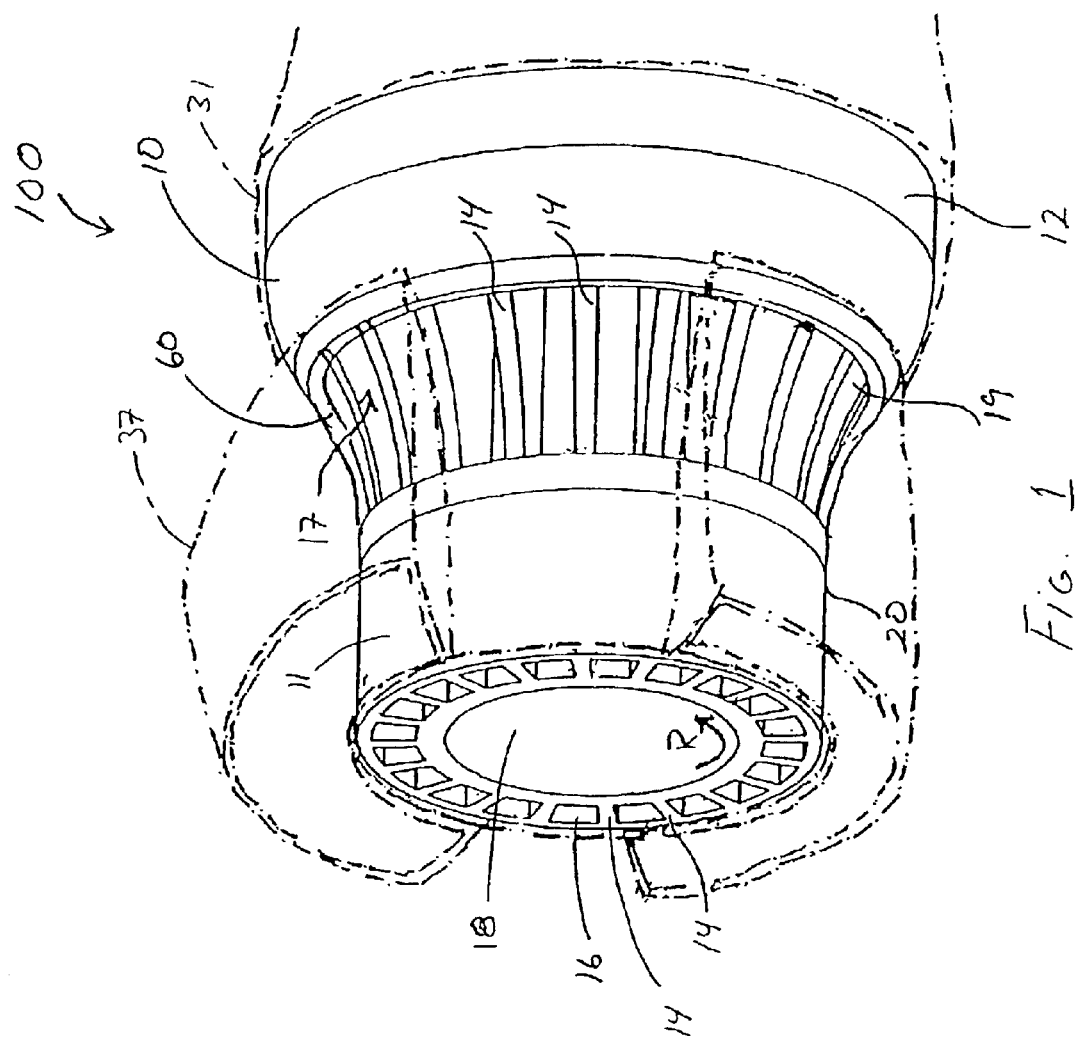
FIG. 1 illustrates a schematic perspective view a rotary ejector wave rotor pulsed detonation engine with optional bypass ducts shown in phantom.

A wave rotor pulsed detonation engine (WRPDE) 10 having a rotary ejector 60, i.e.,a "joiner" or "equalizer" cycle device in wave rotor terminology, to control excessive outflow temperature and velocity and generate more spatially uniform outflow is provided. The combined rotary ejector 60 and WRPDE 10 form a rotary-ejector-WRPDE 100. The rotary ejector 60 is longitudinally integrated with a detonation wave rotor 20 to create a propulsion or gas generation system with a single rotating part.

A rotary ejector 60 can be operated under differing conditions as either a wave-ejector or a wave-fan to regulate or control the non-steady process in a wave rotor. In the case of wave-ejector operation, the inlet air and bypass air flows are usually induced from atmospheric conditions and are thus at the same pressure. Wave-fan operation differs from wave-ejector operation in that the inlet air flow is supplied from a compressor at higher pressure than the bypass air flow, which may be at atmospheric or a relatively lower pressure.

The rotary-ejector-WRPDE 100 includes a rotor 20 having a plurality of channels 16 in which detonative combustion occurs. Each channel 16 comprises a forward combustion passage 11, a rear combustion passage 12, and a transitional combustion passage 19 joining the forward combustion passage 11 to the rear combustion passage 12. The forward combustion passage 11 defines a region in which detonation is initiated. The adjoining transitional and rear combustion passages 19, 12 receive the combusted material from the forward combustion passage 11 and deliver the combusted material to the outlet end 15 of the rotor 20. In addition, the transitional and rear combustion passages 19, 12 cooperate to provide a rotary ejector 60.

The rear combustion passage 12 has a radial height, H, that is larger than the radial height, h, of the forward combustion passage 11. The transitional combustion passage 19 may have a graduated radial height that varies along the length of the rotor 20 to mate the forward combustion passage 11 to a respective rear combustion passage 12. Alternatively, two or more forward combustion passages 11 may communicate with a single rear combustion passage 12 and/or a single transitional combustion passage 19. Each transitional combustion passage 19 includes a rotary ejector inlet 17 through which a low-pressure bypass stream, such as air, may be drawn into the associated rear combustion passage 12. The introduction of the low-pressure bypass air creates the ejector effect. For example, in the canonical case, one can assume that the forward combustion passages 11 operate in a phased manner to provide a steady stream of high-pressure gas to be joined with low-pressure bypass air. The rotary ejector 60 receives the high-pressure and low-pressure streams, which undergo wave compression and wave expansion processes in the wave rotor 20 and exit the wave rotor 20 with equalized intermediate pressure. For given inlet conditions and flow rates of the two streams, the most efficient work transfer results in maximizing the total exit pressure.

Figure 2:
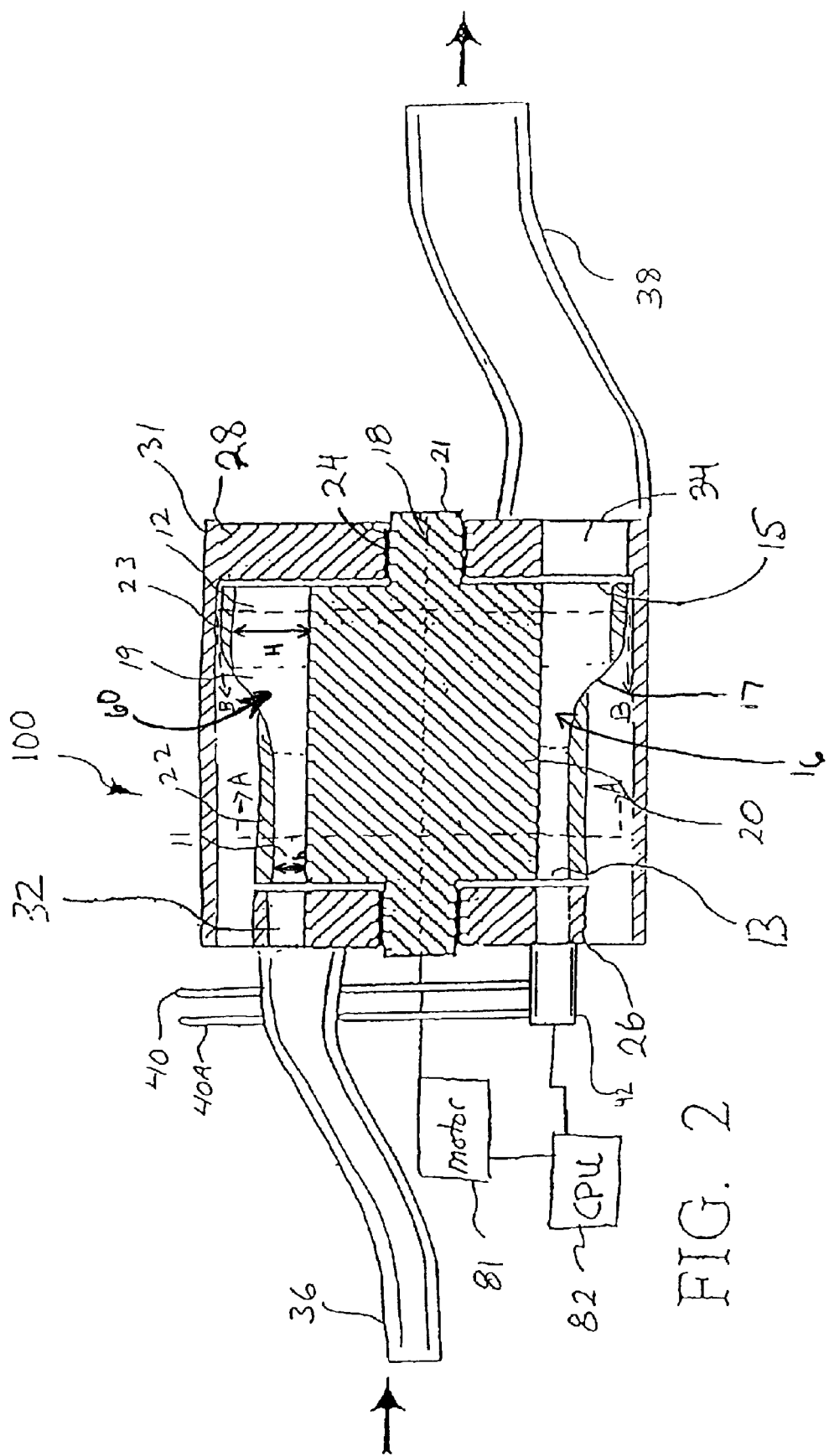
FIG. 2 illustrates a schematic side elevational view in partial cross section of the wave rotor pulsed detonation engine depicted in FIG. 1 showing the wave rotor and its housing in longitudinal cross section.

Referring now to the drawings, wherein like numerals indicate like elements, FIGS. 1 and 2 illustrate a wave rotor pulsed detonation engine 10 with integrated rotary ejector 60. The rotary-ejector-WRPDE 100 includes a rotor 20 rotatably mounted on bearings 24 within a housing 31. The rotor 20 includes a central hub 18, outer shrouds 22, 23, and a plurality of circumferentially-spaced, longitudinally extending combustion channels 16 between the central hub 18 and outer shrouds 22, 23. Detonative combustion is conducted in the forward combustion passages 11 to produce thrust by the rotary-ejector-WRPDE 100. The combustion channels 16 are open at each end of the rotor 20 permitting an inflow of combustion reactants at an inlet end 13 of the rotor 20 and an outflow of the combustion products at an outlet end 15 of the rotor 20.

Figure 3A:
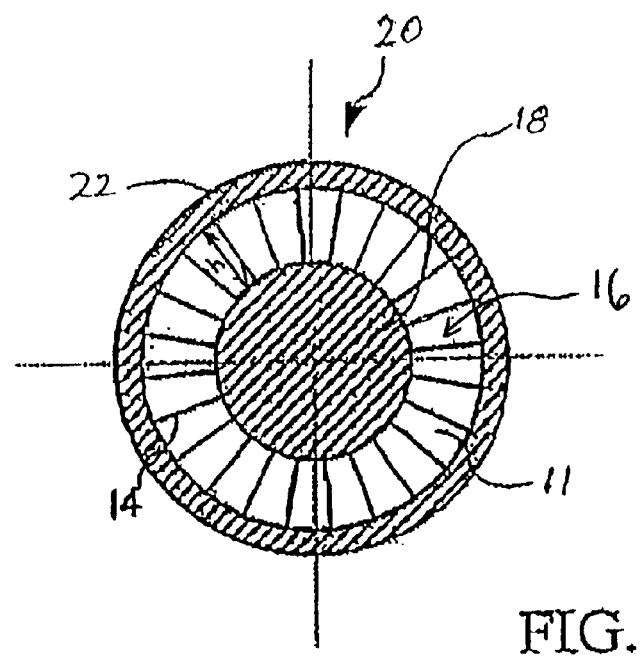
FIG. 3A illustrates a schematic transverse cross-sectional view of the rotor taken along A—A in FIG. 2.
Figure 3B:
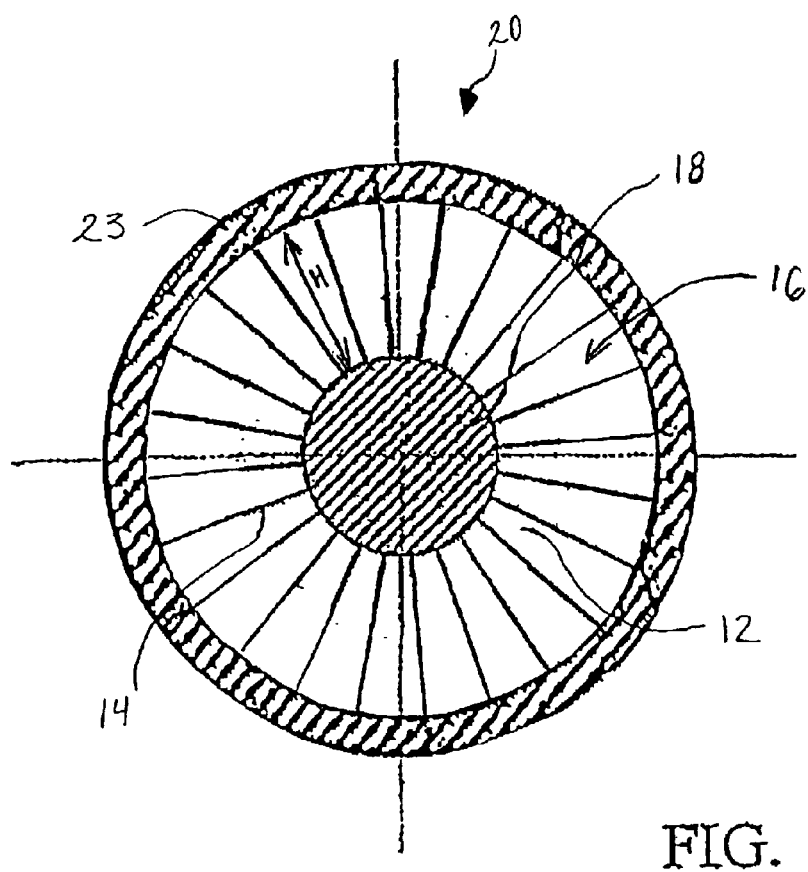
FIG. 3B illustrates a schematic transverse cross-sectional view of the rotor taken along B—B in FIG. 2.

The combustion channels 16 are formed by vanes 14 extending radially outward from the hub 18. The vanes 14 run longitudinally through the rotor 20 from the inlet end 13 to the outlet end 15. In particular, as best shown in FIGS. 2 and 3A, the combustion channels 16 each include a forward combustion passage 11 disposed of the inlet end 13 of the rotor 20. The forward combustion passage 11 is formed by vanes 14 that extend radially from the hub 18 a height, h, to the forward outer shroud 22. Preferably, the forward combustion passage 11 extends longitudinally into the rotor 20 a predetermined distance such as a distance equal to 20% of the total combustion channel length. In addition, as best shown in FIGS. 2 and 3B, each combustion channel 16 also includes a rear combustion passage 12 disposed at the outlet end 15 of the rotor 20. The rear combustion passage 12 is formed by vanes 14 that extend radially from the hub 18 a height, H, to the rear outer shroud 23. Preferably, the ratio of the height, H, to the height, h, is 2, and the rear combustion passage 12 extends longitudinally along the length of the rotor 20 a predetermined distance such as a distance equal to 50% of the total combustion channel length.

Each combustion channel 16 also comprises a transitional combustion passage 19 that joins each forward combustion passage 11 to a respective rear combustion passage 12 to provide a combustion channel 16 that extends the length of the rotor 20, as shown in FIGS. 1 and 2. The transitional combustion passage 19 is formed by vanes 14 that extend radially outward from the hub 18. Unlike the forward combustion passage 11, the transitional combustion passage 19 is partially or completely unshrouded, as shown in FIGS. 1 and 2. The unshrouded portion of the transitional combustion passage 19 provides a rotary ejector inlet 17 through which a bypass stream, such as air, may be introduced into the transitional and rear passages 19, 12 of the rotor 20. One or more bypass ducts 37 may be provided at the rotary ejector inlet 17 to direct the flow of the bypass stream. The regions of the rotary ejector inlet 17 which do not communicate with the bypass duct 37 may be shrouded.

The transitional combustion passage 19 has a radial height that may increase along the length of the rotor 20 in the direction of the outlet end 15. The height of the transitional combustion passage 19 at a given point is defined as the height of the vane 14 at that point. The vane 14 within the transitional combustion passage 19 has a height, h, where the transitional combustion passage 19 adjoins the forward combustion passage 11 and has a height, H, where the transitional combustion passage 19 adjoins the rear combustion passage 12. The height of the vane 14 within the transitional combustion passage 19 may increase in a linear fashion, or may have a curved shape.

Figure 6:
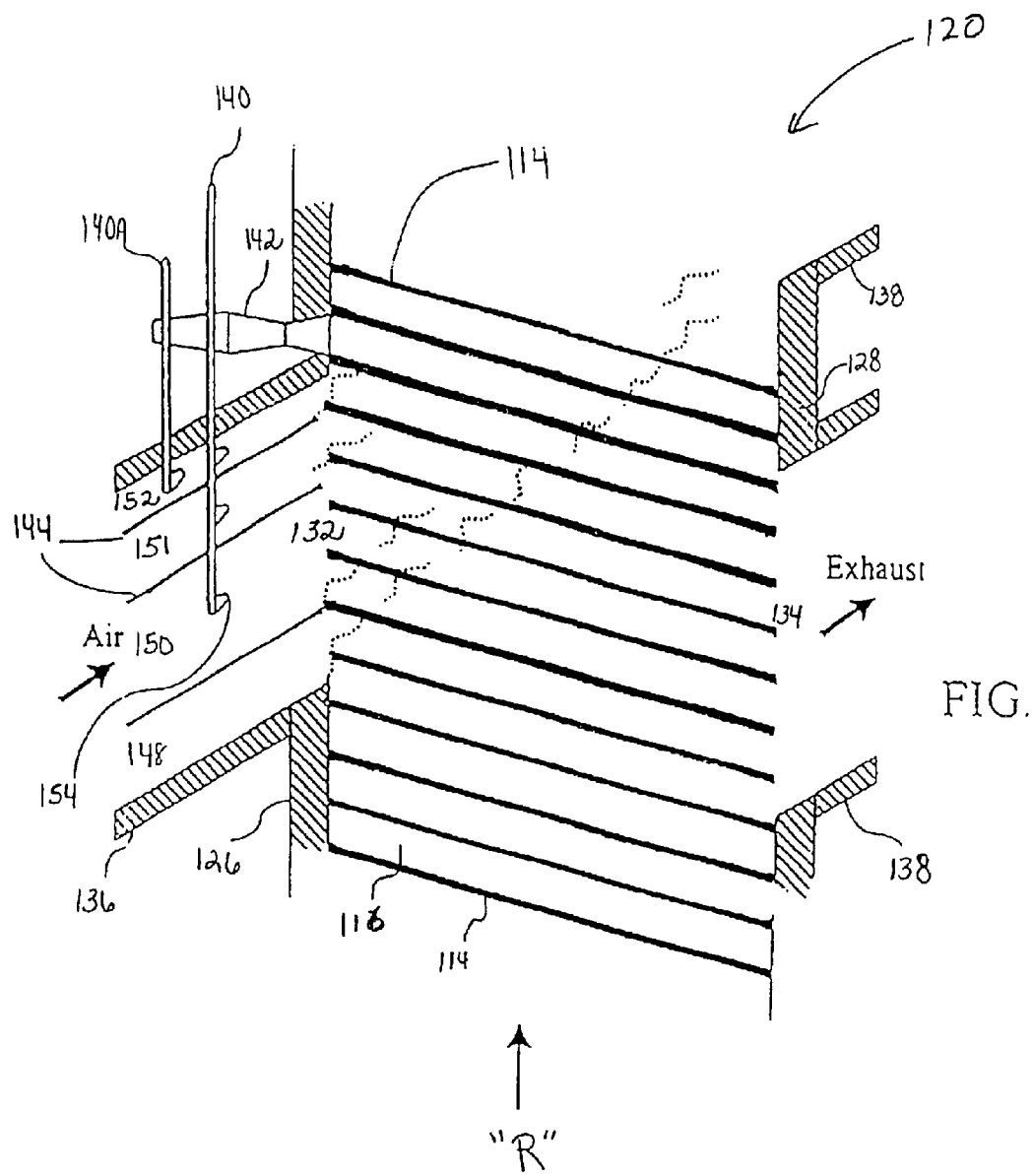
FIG. 6 illustrates a schematic developed view of a rotary ejector wave rotor pulsed detonation engine having helical combustion channels.

The radial vanes 14 may lie within a plane containing a longitudinal axis of the rotor 20, as shown in FIGS. 3A and 3B, or may be curved, as shown, for example, in FIG. 6. The curved vanes 114 may be helically curved with respect to a longitudinal axis of the rotor 120 to create combustion channels 116 that are helically disposed with respect to a longitudinal axis of the rotor 120, as shown in FIG. 6.

Figure 3C:
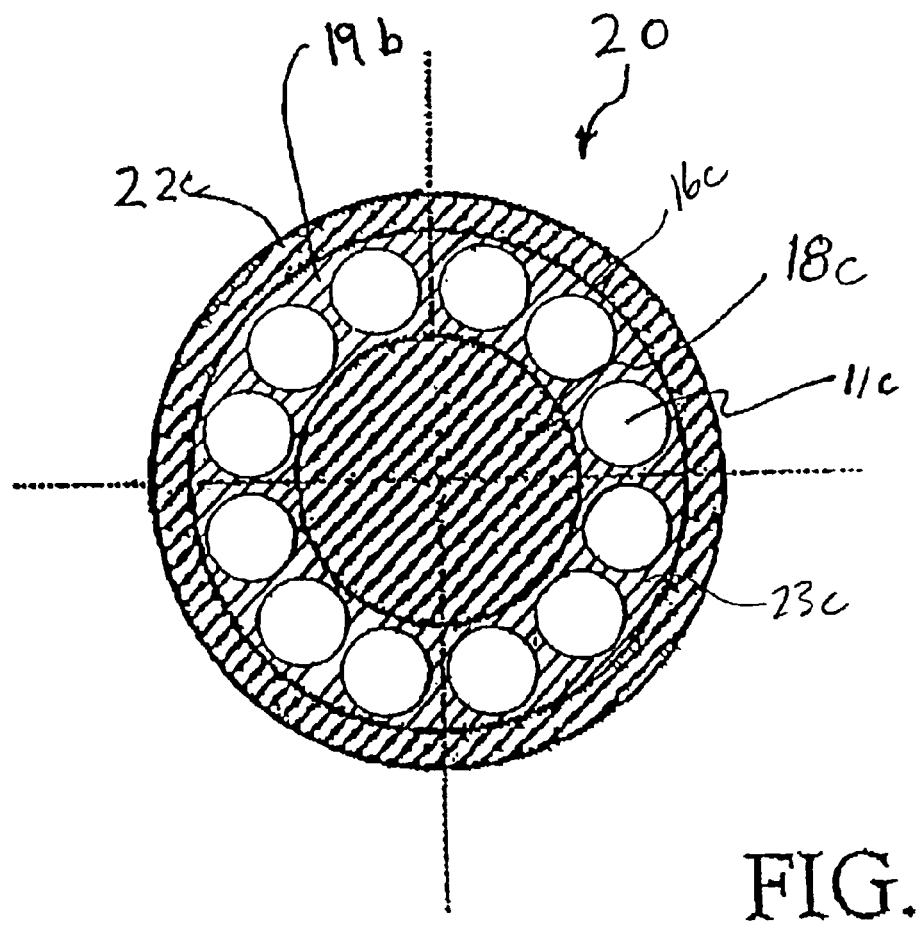
FIGS. 3C and 3D illustrate schematic transverse cross-sectional views, similar to FIG. 3A, showing alternative embodiments of rotors having different combustion channel shapes.

In an alternative configuration, as shown in FIG. 3C, the combustion channels 16c may be cylindrical in shape having a circular cross section. The channels 16c are disposed side-by-side in an annular member 23c disposed between the hub 18c and outer shroud 22c. Alternatively, the annular member 23c, the hub 18c, and the outer shroud may all be integrated into a one-piece unit.

Figure 3D:
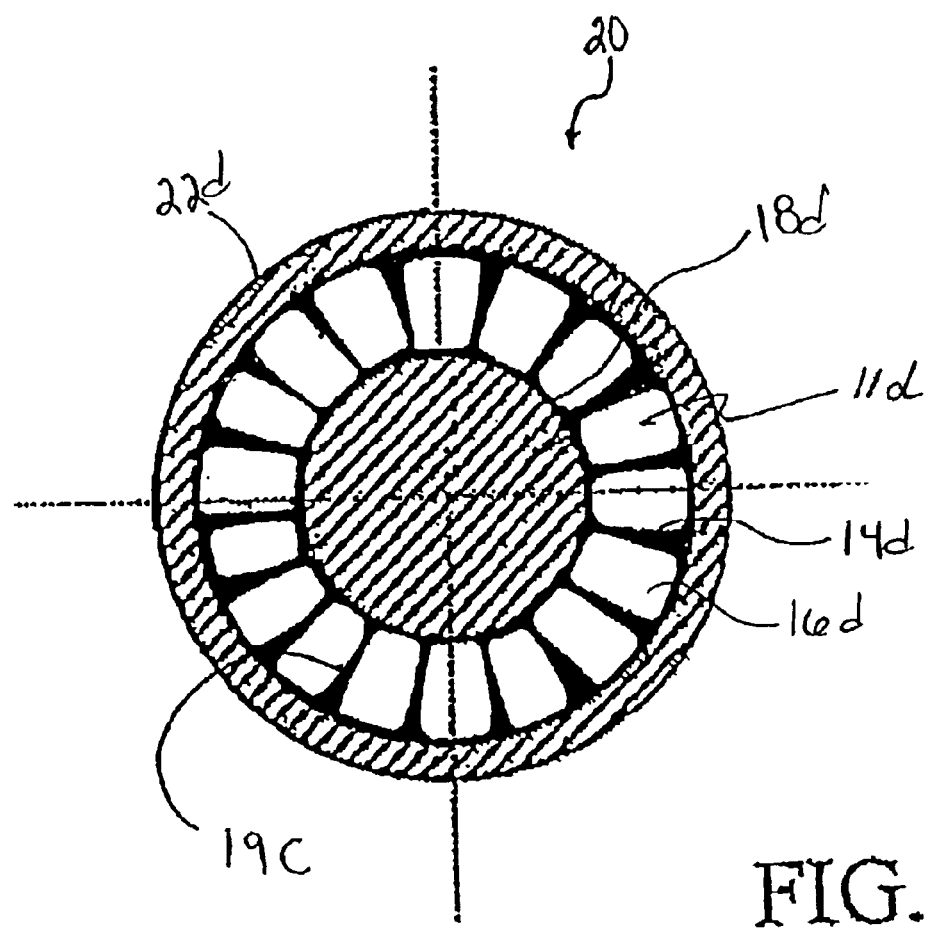

In another alternative configuration, as shown in FIG. 3D, the combustion channels 16d have a cross section that is generally rectangular with rounded corners. The channels 16d are disposed side-by-side in an annular region 23d between the hub 18d and outer shroud 22d. Again, the hub 18d, the outer shroud 22d and the annular region 23d may be a one-piece unit. Other combustion passage cross sectional shapes are also possible. For example, the forward, transitional, and rear passages 11, 19, 12 may have different cross-sections with appropriate smooth blending of one cross section with another. Optionally, the radial height of the annular region containing the combustion channels 16 is 20% to 40% of the rotor radius. Furthermore, 15 to 30 passages may be disposed about the circumference of the annular region.

The rotor 20 and housing 31 are formed of metal or other materials known in the manufacture of wave rotors. However, the materials of the wave rotor 20 and housing 31 must be chosen to withstand the detonative combustion process. Preferably, the vanes 14 are integrally formed with the hub 18 and shrouds 22, 23.

Figure 4A:
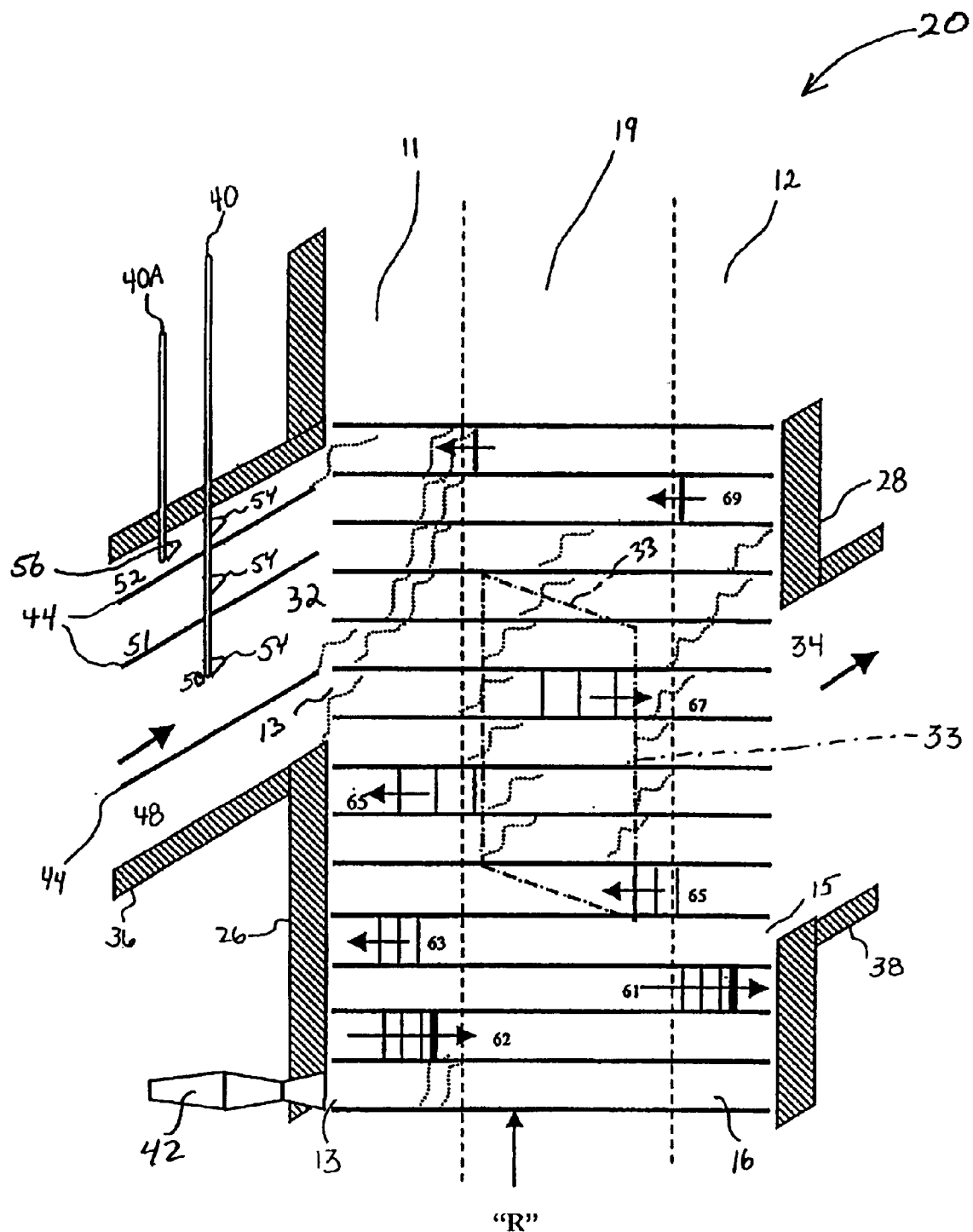
FIG. 4A illustrates a schematic developed view of the wave rotor and the external structure of the wave rotor pulsed detonation engine of FIG. 2.
Figure 5:
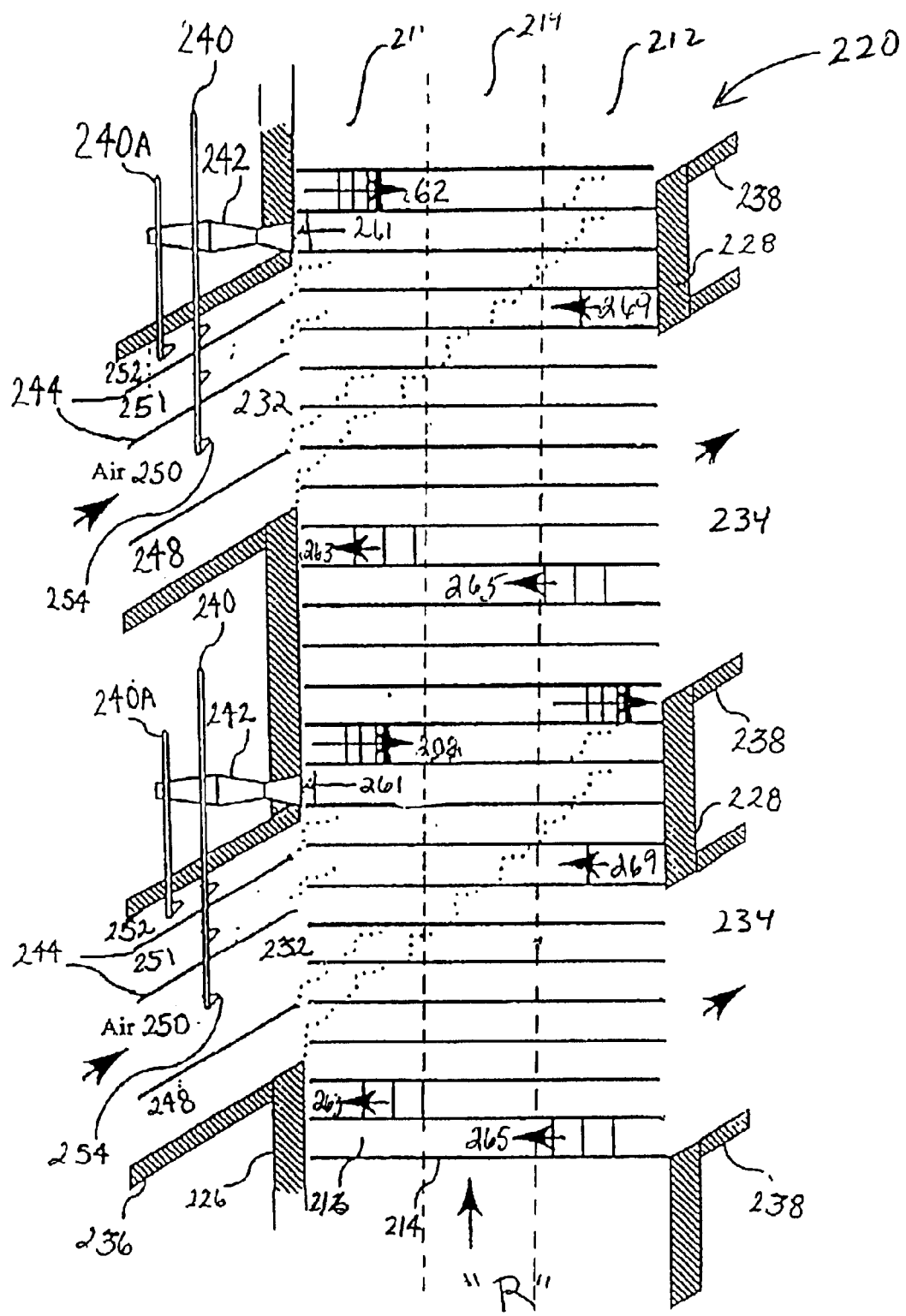
FIG. 5 illustrates a schematic developed view of a rotary ejector wave rotor pulsed detonation engine having two inlet ports and two exhaust ports.

The housing 31 is in the form of a casing having a first circular disc-shaped end wall 26 and a second circular disc-shaped end wall 28. The end walls 26, 28 have a central cylindrical aperture for bearings 24 that rotatably receive the rotor shaft 21. The end walls 26, 28 each have partial-annular ports 32, 34 to allow gases to be admitted to or expelled from the combustion channels 16. As shown in FIGS. 2 and 4A, the first end wall 26 has one inlet port 32 connected to an inlet duct 36, and the second end wall 28 has one exhaust port 34 connected to an exhaust duct 38. In an alternative configuration, as shown in FIG. 5, the rotary-ejector-WRPDE 100 may have two inlet ports 232 and two exhaust port 234. The use of two inlet ports 232 and two exhaust ports 234 permits better balancing of the thrust and mechanical loads. The inlet port 232 and bypass port may have a helical shape to provide rotational velocity to the rotor 20. An even greater number of inlet and exhaust ports may be used. Preferably, the number of inlet ports equals the number of exhaust port, and the number of bypass ports equals the number of inlet ports.

The relative circumferential locations of the inlet and outlet ports are determined primarily by calculation of the rates of physical and chemical processes in the gas in the combustion channels 16, including the speeds of pressure waves and the combustion chemical rates. These calculations taken together with the length and rotation speed of the rotor 20 provide estimates of the time required for transit of waves and the ignition delay time for initiation of the detonation wave, in terms of circumferential displacement of the rotor 20.

FIG. 4A is a developed view showing the rotary-ejector-WRPDE 100, taken through the combustion channels 16. The partial-annular ports 32, 34 are shown in circumferential section, and the bypass port 33 is shown in phantom. For purposes of defining the relative location of elements shown in FIG. 4A, the angular position about the direction of rotation of the rotor 20 is measured in degrees, clocked from the lower inlet duct wall 36 proximate the first inlet zone 48. Axial position along the length of the rotor 20 is measured as a percentage of rotor length displaced from the inlet end 13 toward the outlet end.

The combustion channels 16 appear as a horizontally stacked array, the rotation of the combustion channels 16 appears as translation along the direction "R". The combustion channels 16 move from the bottom to the top of FIG. 4A upon rotation. For simplicity, the schematic diagram of FIG. 4A illustrates a configuration designed for only one combustion and work-exchange cycle per revolution having only one inlet port 32, one bypass port 33, and one exhaust port 34. FIG. 5 illustrates a configuration having two inlet ports 232, two bypass ports, and two exhaust ports 234. The elements in FIG. 5 are umbered in a similar manner to those of FIG. 4A, but using 200-series numerals. FIG. 6 illustrates a configuration where the combustion channels 116 are helically disposed with respect to a longitudinal axis of the rotor 120. The elements in FIG. 6 are numbered in a similar manner to those of FIG. 4A, but using 100-series numerals. In a developed view, as shown in FIG. 6, the pitch of the helix of the combustion channels 116 is represented by the slope of the combustion passage vanes 114. In a preferred helical configuration, the pitch of the helix is such that the combustion channels 116 are slanted downward, in a developed view, from the inlet port 132 towards the exhaust port 134, where the direction of rotation is in the upward direction shown as "R".

In the configuration containing one inlet port 32 and one exhaust port 34, as shown in FIG. 4A, the inlet port 32 and exhaust port 34 each has a circumferential extent subtending about 180 degrees. Each port 32, 34 communicates with approximately one-half of the combustion channels 16 at any instance. Preferably, the inlet port 32 is circumferentially offset by about 90 degrees downstream with respect to the rotation direction "R " from the exhaust port 34. In a preferred configuration, an inlet port 32 and paired exhaust port 34, having substantially equal circumferential extent, are circumferentially offset from one another by about one-half of their circumferential extent, with the inlet port 32 being downstream from the exhaust port 34.

The bypass port 33 has a circumferential extent subtending about 180 degrees and has a shape that is designed to match the motion of waves in the channels 16. In the configuration of FIG. 4A, the shape of the bypass port 33 is quadrilateral with corners located at the coordinates (55%, 105 degrees), (30%, 75 degrees), (30%, 285 degrees), and (55%, 255 degrees).

In a rotary-ejector-WRPDE 100 where the ratio of inlet port pressure to bypass port pressure is small (less than 2), the inlet port 32 is positioned with respect to the bypass port 33 such that a representative combustion channel 16 engages the inlet port 32 after engaging the bypass port 33. As illustrated in FIG. 4A, there may be overlap between the period when a combustion channel 16 engages the inlet port 32 and the bypass port 33.

Under the particular operating condition where the inlet port pressure and bypass port pressure are substantially equal, the inlet port 32 is positioned with respect to the bypass port 33 such that a representative combustion channel 16 engages the inlet port 32 at approximately the same time or earlier than the representative combustion channel 16 engages the bypass port 33. Under such conditions, the exhaust port may, but not necessarily, subtend 360 degrees. The inlet port 32 may have circumferential extent subtending about 180 degrees. The bypass port 33 may have circumferential extent subtending about 210 degrees.

Under operating conditions where the ratio of inlet port pressure to bypass port pressure is larger than 2, a representative combustion channel 16 engages the inlet port 32 after engaging the bypass port 33. In such a case, the inlet port 32 and bypass port 33 do not communicate with any of the channels 16 at the same time. In addition, the exhaust port 34 and inlet port 32 are disposed relative to one another such that no combustion channel 16 communicates simultaneously with both the exhaust port 34 and inlet port 32.

In yet another alternative configuration, the inlet port 32 has a circumferential extent subtending about 60 degrees, and the exhaust port 34 has a circumferential extent from a location at about 180 degrees to a location at about 240 degrees. The bypass port 33 has a circumferential extent about 90 degrees. The bypass port 33 has a quadrilateral shape with corners located at the coordinates (55%, 240 degrees), (30%, 240 degrees), (30%, 330 degrees), and (55%, 330 degrees). In still another alternative configuration, having two inlet ports 232, as shown in FIG. 5, two bypass ports, and two exhaust ports 234, each port subtends a circumferential extent of about 90 degrees, and each inlet port 232 and paired exhaust port 234 is circumferentially offset from one another by about 45 degrees. Additional configurations having more inlet and exhaust ports and having the same relative proportions and locations are possible.

Returning to FIG. 4A, an inlet duct 36 for receiving air and delivering air and combustible materials to the inlet port 32 is connected to the first end wall 26, communicating with the inlet port 32. An exhaust duct 38 for discharging combustion produce is connected to the second end wall 28, communicating with the exhaust port 34. Preferably the inlet duct 36 and bypass duct 37, shown in FIG. 1, are designed to receive air at atmospheric pressure. The inlet duct 36 may be attached perpendicular to the first end wall 26. Alternatively, the inlet duct 36 may be attached to the first end wall 26 at an angle as shown in FIGS. 4A and 5.

As shown in FIGS. 4A, 5, and 6, the inlet duct 36 is partitioned into several inlet zones 48, 50, 51, 52. The inlet zones 48, 50, 52 provide for pre-mixing air and combustible materials of varying concentrations and introducing such materials into the combustion channels 16 in a stratified manner. Inlet duct vanes 44 are disposed within the inlet duct 36 to create the inlet zones 48, 50, 51, 52. In a specific embodiment, at least three inlet duct vanes 44 are used creating at least four inlet zones 48, 50, 51, 52. The inlet duct vane 44 may be equally spaced within the inlet duct 36, thus creating inlet zones 48, 50, 51, 52 of equal circumferential width. Alternatively, the inlet zone spacing may be unequal. In a selected configuration, the inlet zones have the same circumferential width as the circumferential width of the forward combustion passages 11. The air and combustible materials are drawn into the forward combustion passages 11 by the action of an expansion wave 65 which is discussed below in connection with the combustion cycle timing. The stratification of the inlet duct 36 is chosen to aid in establishing proper conditions for detonative combustion.

In particular, a first inlet zone 48 is located at a leading edge of the inlet port 32 such that the combustion channels 16 encounter the first inlet zone 48 before any other inlet zones as the combustion channels 16 rotate past the inlet port 32. The first inlet zone 48 preferably introduces air and no combustible materials into the inlet end 13 of a representative combustion channel 16 forming a noncombustible region within the representative combustion channel 16. This noncombustible region provides a buffer from any previously existing hot gases that may be present within the representative combustion channel 16 thus inhibiting any subsequent combustible materials introduced into the representative combustion channel 16 from prematurely igniting. The volume of air introduced into the representative combustion channel 16, and thus the width of the buffer layer, is governed by the flow rate of air into the representative channel 16 and the rate of rotor rotation relative to the circumferential width of the first inlet zone 48. The spacing of the inlet vane 44 that defines the circumferential width of the first inlet zone 48 is selected with regard to the rotor rotation rate and air flow rate to create a buffer layer of sufficient volume.

A first intermediate inlet zone 50 positioned adjoining the first inlet zone 48 includes a first fuel injector 54 for injecting fuel into the intermediate inlet zone 50. The first fuel injector 54 is fed by fuel line 40 which is connected to an appropriate fuel source such as a hydrocarbon fuel or hydrogen. The first intermediate inlet zone 50 is located adjacent to the first inlet zone 48 such that the representative combustion channel 16 will successively encounter the first intermediate inlet zone 50 after the first inlet zone 48, as determined by the direction of rotation R. Thus, the first intermediate inlet zone 50 delivers a combustible material to the representative combustion channel 16 adjacent to the initial buffer layer. The concentration of combustible material delivered to the combustion channel 16 is controlled by the discharge rate of fuel from first fuel injector 54. The volume of combustible material introduced into the representative combustion channel 16 is governed by the flow rate of combustible material into the representative channel 16 and the rate of rotor rotation relative to the circumferential width of the first intermediate inlet zone 50. The spacing of the inlet vane 44 that defines the circumferential width of the first intermediate inlet zone 50 is selected with regard to the rotor rotation rate and flow rate to create a combustion layer of sufficient volume.

The inlet duct 36 may also contain a second intermediate inlet zone 51 disposed adjacent to the first intermediate inlet zone 50. The second intermediate inlet zone 51 contains a second fuel injector 54 connected to the fuel line 40. The second intermediate inlet zone 51 is configured to deliver a second combustible layer to the representative combustion channel 16 as the representative combustion passage rotates into registry with the second intermediate inlet zone 51. The configuration and design considerations of the second intermediate inlet zone 51 are analogous to the considerations of the first intermediate inlet zone 50 discussed above. Additional intermediate inlet zones may be employed in the inlet duct 36 by the use of additional inlet duct vanes 44.

The last inlet zone 52 is located adjacent to the final intermediate inlet zone (the second intermediate inlet zone 51 in the configuration of FIG. 4A) and adjacent to a trailing edge of the inlet port 32 such that the combustion channels 16 encounter the last inlet zone 52 before the combustion channels 16 rotate beyond the inlet port 32. The last inlet zone 52 includes a fuel injector 54 attached to the fuel line 40, the fuel injector 54 operating in a similar manner to the other fuel injectors 54. In addition, the last inlet zone 52 preferably includes an enhancement injector 56 attached to enhancer line 40A for injecting a combustion enhancer into the last inlet zone 52. Thus, the last inlet zone 52 introduces combustible materials along with a combustion enhancer into the inlet end 13 of the representative combustion channel 16 forming a region particularly susceptible to detonative ignition. The combustion enhancer may be an oxidant, a fuel, or a chemical enhancer known or use in combustion processes. The quantity of combustible material introduced into the representative combustion channel 16 is governed by the same considerations discussed above. In particular, the quantity and composition of the combustible material introduced by the last inlet zone 52 is designed to promote an ignition that causes detonative combustion.

The rotary-ejector-WRPDE 100 further includes an igniter 42 preferably mounted in the first wall 26 proximal to or following the last inlet zone 52. Preferably, where there is more than one inlet port 32, separate igniters 42 are provided proximal to each inlet port 32, as seen for example in FIG. 5. A first preferred ignition device 42, as depicted in FIGS. 4A and 5, is a continuous-flow chemical reaction passage similar to a rocket engine passage. It is supplied with fuel from feed line 40 and with oxidant from feed line 40A. It may incorporate an injection nozzle designed for supersonic injection of hot gas deep into the main combustion channels 16.

Figure 4B:
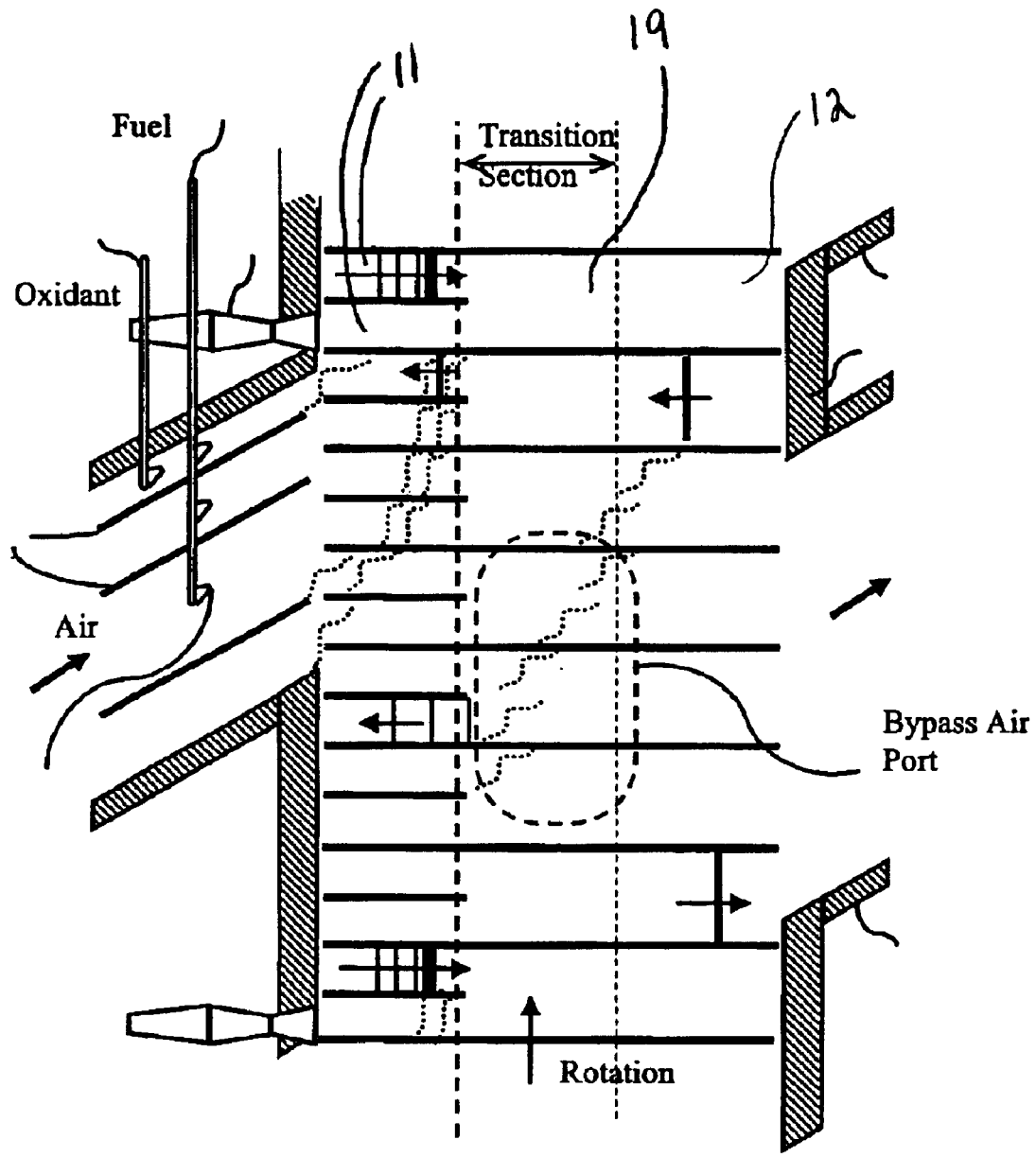
FIG. 4B illustrates a schematic developed view similar to that of FIG. 4A, but having two forward combustion passages in communication with a single rear combustion passage and a single transitional combustion passage.

The rotary-ejector-WRPDE 100 further includes an igniter 42 preferably mounted in the first wall 26 proximal to or following the last inlet zone 52. Preferably, where there is more than one inlet port 32, separate igniters 42 are provided proximal to each inlet port 32, as seen for example in FIG. 5. A first preferred ignition device 42, as depicted in FIGS. 4 and 5, is a continuous-flow chemical reaction passage similar to a rocket engine passage. It is supplied with fuel from feed line 40 and with oxidant from feed line 40A. It may incorporate an injection nozzle designed for supersonic injection of hot gas deep into the main combustion channels 16.

An alternative configuration of the ignition device 42 uses atmospheric air as an oxidant instead of a stored oxidant. Another configuration of the ignition device 42, applicable to a non-reusable flight vehicle, burns solid rocket fuel stored within the ignition device 42 to produce hot ignition gas for the main combustion channels 16. Yet another configuration of the ignition device 42 generates a beam of electromagnetic radiation, including, but not limited to laser light or microwave radiation, which is focused into the rotating combustion channels 16 through a window in end wall 26 of the rotary-ejector-WRPDE 100. As an alternative arrangement, the ignition device 42 may be located in the second wall 28 with the stratification scheme described above being altered so that a region of combustible materials suited to ignite detonative combustion is located proximal to the outlet end 15 of the combustion channels 16 at the second wall 28.

The rotary-ejector-WRPDE 100 includes a motor 81 operably connected to the rotor 20 for rotating the rotor. Preferably the rotary-ejector-WRPDE 100 includes a CPU 82 for operably controlling the fuel injectors 54, the motor 81, the igniter 42, and the enhancement injector 56. The CPU 82 controls the operating speeds, flow rates, and timing of the applicable elements to control the detonative combustion process.

Figure 8:
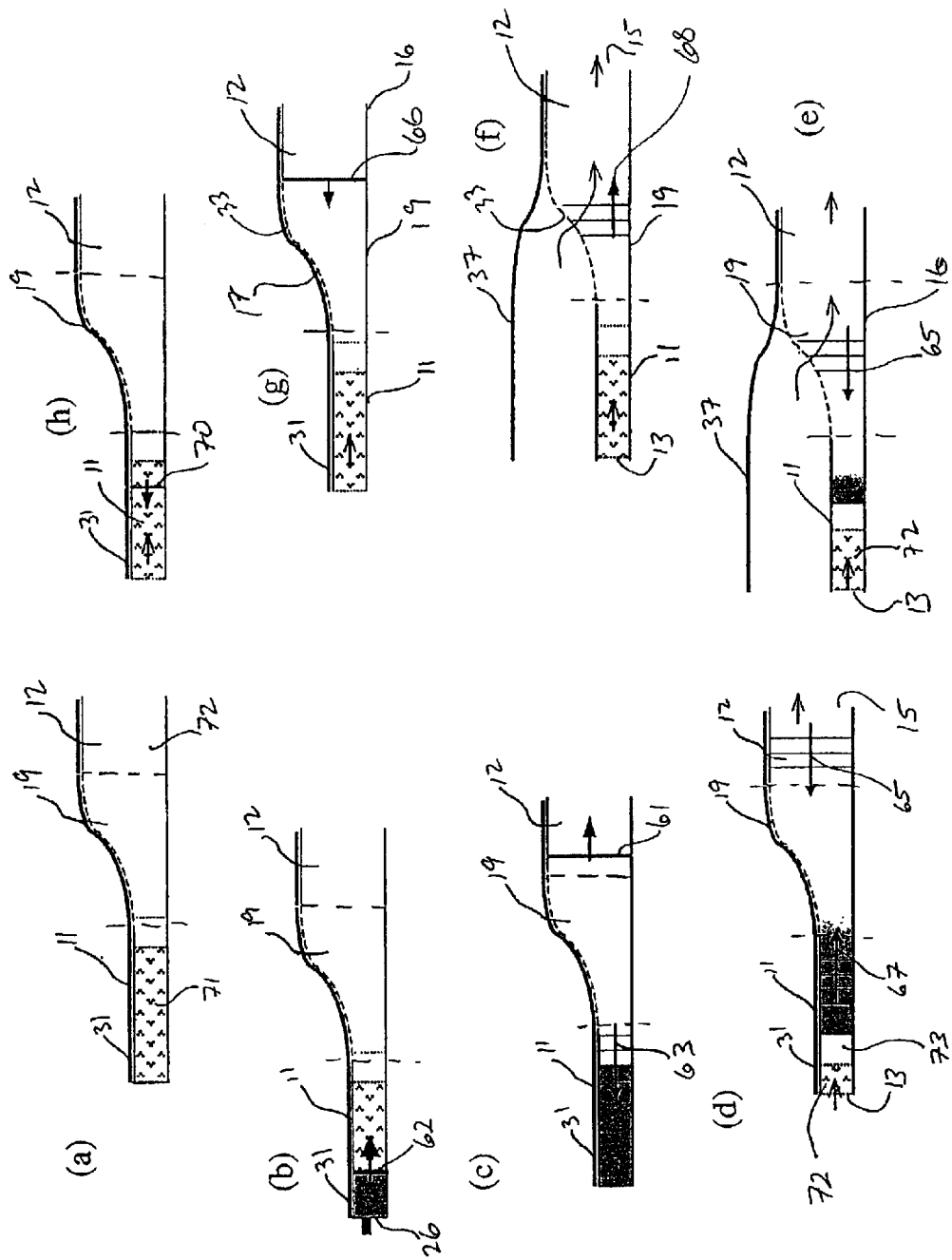
FIGS. 8A–8H schematically illustrate the cycle of combustion events within a combustion channel of a rotary ejector wave rotor pulsed detonation engine.

The sequence of combustion events occurring within a representative combustion channel 16 is illustrated in FIGS. 8A-8H which show the representative combustion channel 16 at different stages of its rotation. In FIG. 8A, the forward combustion passage 11 contains a quiescent detonable mixture 71, while the rear combustion passage 12 contains a quiescent residual mixture 72 of combusted gas and in-mixed air from the previous cycle. As shown in FIG. 8B, detonation is initiated at the first end wall 26. A detonation wave 62 moves rapidly to the right towards the rear combustion passage 12, pressurizing and accelerating the gas until the detonation wave 62 reaches non-combustible mixture and converts to a shock wave 61, as shown in FIG. 8C. As the shock wave 61 traverses the transitional combustion passage 19, the large area change between the forward combustion passage 11 and the transitional combustion passage 19 causes a first expansion wave 63 to be reflected to the left, while the shock wave 61 is transmitted to the right. The first expansion wave 63 arrives at the inlet end 13 and reflects from the first end wall 26, forming a first reflected wave 67 and depressing the pressure locally.

Meanwhile the shock wave 61 reflects at the open outlet end 15 and forms a second expansion wave 65, as shown in FIG. 8D. Whenever the second expansion wave 65 arrives at the inlet end 13, the pressure at the inlet end 13 is depressed further. The inlet end 13 rotates into communication with the inlet port 32, and fresh detonable mixture 72 is admitted, as shown in FIG. 8D. An optional buffer layer 73 of unfueled air may precede the detonatable mixture 72. Depending on the inlet end pressure, the opening of the inlet end 13 may be delayed until a desired pressure is reached.

As shown in FIG. 8E, the transitional combustion passage 19 of the combustion channel 16 comes into communication with the bypass air duct 37 just as the reflected second expansion wave 65 depresses the pressure in this region, thus admitting bypass air into the rear combustion passage 12. The forward combustion passage 11 may continue to admit detonable mixture 72. As shown in FIG. 8F, the second expansion wave 65 arrives at the inlet end 13 and is reflected back towards the outlet end 15, forming a second reflected wave 68. Depending on the relative wave strengths, inflow at the inlet end 13 may continue or slow down.

As shown in FIG. 8G, when the second reflected wave 68 reaches the outlet end 15, a third reflected wave 66 reflects and the outflow terminates. At this point the exhaust port 34 may be closed, again as an option, depending on pressures and velocities. If the exhaust port 34 is closed, a compression wave may develop at the outlet end 15 and may merge with the reflected wave 66. When the third reflected wave 66 arrives at the rotary ejector inlet 17 and slows the bypass inflow, the channel 16 moves out of communication with the bypass port 33, preventing backflow. As the third reflected wave 66 traverses the channel 16, it forms a shock wave 70. As shown in FIG. 8H, the transmitted shock wave 70 enters the forward combustion passage 11 and slows or terminates the combustible mixture 72 inflow, whereupon the primary inlet port 32 is closed.

Figure 7A:
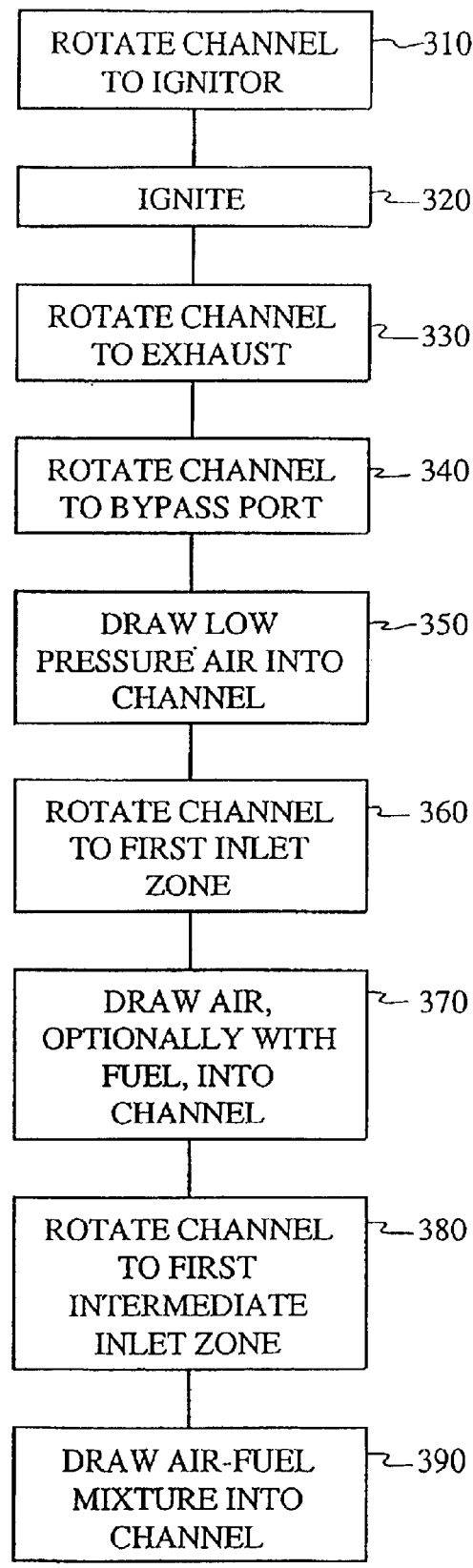
FIGS. 7A and 7B illustrate a flowchart of a method of operation of a rotary ejector wave rotor pulsed detonation engine.
Figure 7B:
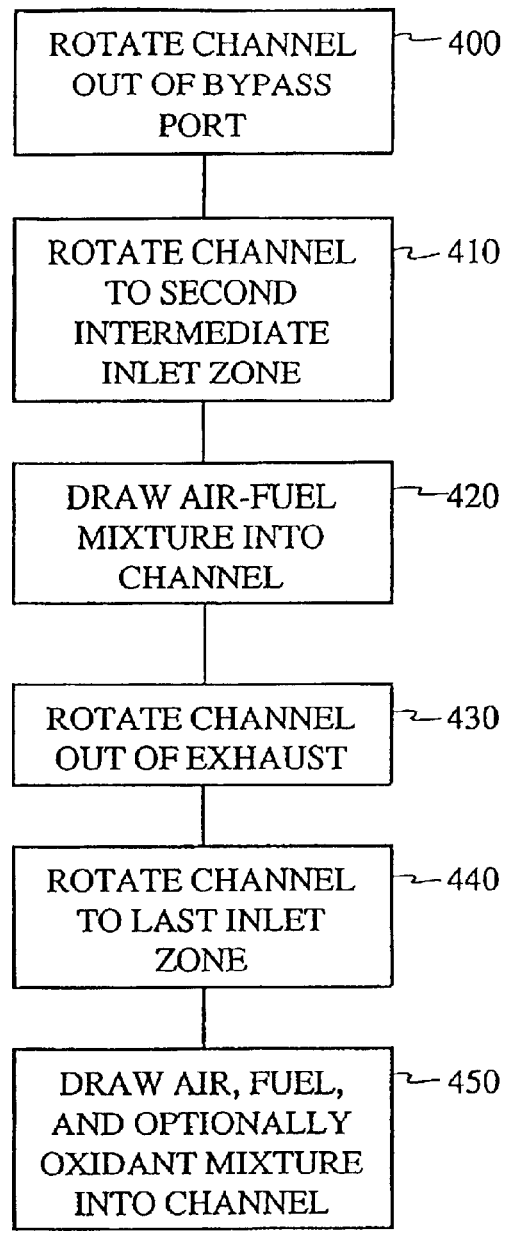

Having described the combustion events for a single combustion channel 12, it is possible to describe the method of operation of the rotary-ejector-WRPDE 100. The method for operating a rotary-ejector-WRPDE 100 is schematically illustrated in the flow cycle diagram of FIGS. 7A and 7B which corresponds to the configuration of the wave rotor shown in FIG. 4A. For simplicity, the schematic diagram of FIG. 4A illustrates a canonical configuration of the invention having only one inlet port 32, one bypass port 33, and one exhaust port 34 and is designed for operation at one combustion cycle per revolution. In alternative arrangements, a rotary-ejector-WRPDE may be provided that, in a single revolution of its rotor, completes multiple full cycles of combustion.

Beginning at the bottom of the diagram of FIG. 4A, the internal processes and external interactions of a representative channel 16 will be described, it being understood that all combustion channels 16 experience the same processes sequentially and cyclically, but at different times. The rotor 20 rotates to bring a representative combustion channel 16 containing a quiescent detonatable mixture in the forward combustion passage 11 into communication with the ignition device 42, at step 310 of FIG. 7A. Detonation in the forward combustion passage 11 is initiated, at step 320, by injecting hot gases into the forward combustion passage 11 from the ignition device 42. The combustible mixtures are ignited by the ignition device 42, thus producing a detonation wave 62 which combusts mixture in the forward combustion passage 11 and accelerates the gases in the forward combustion passage 11 towards the exhaust port 34. The detonation wave 62 travels through the gases in the transitional combustion passage 19 and the rear combustion passage 12 as shock wave 61. Upon traversing the transitional combustion passage 19, a portion of the shock wave 61 is reflected towards the inlet end 13 as a first expansion wave 63. At step 330, the representative combustion channel 16 moves into communication with the exhaust port 34. The shock wave 61 then arrives at the outlet end 15 of the representative combustion channel 16. The pressurized gases produced by the shock wave 61 exit the representative combustion channel 16 into the exhaust duct 38, creating a second expansion wave 65 which travels from the outlet end 15 towards the inlet end 13.

The rotor 20 is rotated into registry with the bypass port 33 just as the second expansion wave 65 arrives at the transitional combustion passage 19, at step 340, and depresses the pressure at the bypass port 33. At step 350, the presence of depressed pressure at the bypass port 33 draws air into the representative channel 16 to occupy a central portion of the representative channel 16.

The second expansion wave 65 then arrives at the inlet end 13 of the representative combustion channel 16 just as the representative combustion channel 16 rotates into communication with the first inlet zone 48 of inlet port 32, at step 360. The resulting depression of air pressure causes air to be drawn into the representative combustion channel 16 from the first inlet zone 48, at step 370. The first inlet zone 48 contains air to create a sufficient buffer layer of non-reactive air within the representative combustion channel 16 which inhibits the hot gases in the representative combustion channel 16 from prematurely igniting subsequently admitted fuel-air mixtures. The volume of air drawn into the representative combustion channel 16, defining the width of the buffer layer, is dictated by the flow rate of air into the representative combustion channel 16 and the rate of rotor rotation relative to the circumferential width of the first inlet zone 48.

The rotor 20 continues its rotation bringing the representative combustion channel 16 into communication with the first intermediate inlet zone 50, at step 380. A first combustible mixture of fuel and air is drawn into the representative combustion channel 16 from the first intermediate inlet zone 50, at step 390. The combustible mixture is created by injecting a fuel through injector 54 from fuel line 40 into the first intermediate inlet zone 50. The concentration of combustible material delivered to the representative combustion channel 16 is controlled by the discharge rate of fuel from the first fuel injector 54. The volume of combustible material introduced into the representative combustion channel 16 is governed by the flow rate of combustible material into the representative channel 16 and the rate of rotor rotation relative to the circumferential width of the first intermediate inlet zone 50.

At step 400, the representative channel 16 is rotated out of communication with the bypass port 33, which terminates the flow of air into the representative channel 16. Alternatively, in another embodiment, in which the pressure of air in the inlet port 32 is substantially greater than in the bypass port 33, the representative channel 16 is rotated out of communication with the bypass port 33 before it is rotated into communication with the inlet port 32. Alternatively, in yet another embodiment, in which the pressure of air in the inlet port 32 is substantially similar to that in the bypass port 33, the representative channel 16 is rotated out of communication with the bypass port 33 after it is rotated into communication with the inlet port 32.

The rotor 20 continues its rotation bringing the representative combustion channel 16 into communication with the second intermediate inlet zone 51, at step 410. A second combustible mixture of fuel and air is drawn into the representative combustion channel 16 from the second intermediate inlet zone 51, at step 420. The concentration and quantity of combustible mixture produced is dictated by the same considerations discussed above in regard to the first intermediate inlet zone 50, except that the concentration and quantity of the combustion mixture produced at the second intermediate inlet zone 51 may be different relative to the first intermediate inlet zone 50.

The rotor 20 rotates the representative combustion channel 16 into communication with the last inlet zone 52, at step 440. The last inlet zone 52 may preferably, in addition to mixing fuel and air, admix from the feed line 40A a combustion enhancer such as an oxidant or another substance that can enhance the initiation of detonation. This preferably enhanced mixture is drawn into the representative combustion channel 16, at step 450.

At step 430, the representative channel 16 is rotated out of communication with the exhaust port 34. The abrupt closure of the outlet end 15 of the representative combustion channel 16 may cause a compression wave 69 to develop at the outlet end 15 of the representative combustion channel 16. The compression wave 69 travels towards the inlet end 13 of the representative combustion channel 16 and progressively causes inflowing gases to stop their motion towards the outlet end 15 of the representative combustion channel 16. The relative circumferential locations of the exhaust port 34 and ignition device 42 are arranged so that the compression wave 69 arrives at the first end wall 26 immediately after the injection of ignition gases. Reflection of the compression wave 69 off of the first end wall 26 accelerates the formation of the detonation wave 62, which combusts all the combustible mixtures in the representative combustion channel 16 as the detonation wave 62 moves rapidly towards the second wall 28. Steps 310 through 450 are repeated cyclically and sequentially for each representative combustion channel 16.

As shown in FIG. 5, multiple combustion cycles can be effected for each single revolution of the rotor 220 by providing multiple inlet and exhaust ducts 236, 238. As the rotor 220 rotates, each combustion channel 216 experiences a periodic sequence, or cycle, of events. Identical events occur in all combustion channels 216, but at different times. In the illustration of FIG. 5, two cycles are completed in one rotation. A detonation is produced in each forward combustion passage 211 in a fuel-air mixture admitted through partial-annular inlet ports 232. During a portion of the cycle, the unshrouded part of each rear combustion passage 212 admits air flow radially and axially from the partial-annular bypass air port. During the remaining portion of the cycle, the rear combustion passage 212 is disconnected from the bypass port, and the detonation in the forward combustion passage 211 is transmitted as a shock wave 261 to the confined admitted air, thus energizing the confined admitted air and achieving a non-steady ejector effect. Further features of the apparatus and methods for use thereof shall be made apparent in the following examples.

EXAMPLES

Computational Results

Preliminary analysis may be performed using a quasi one-dimensional, uniform-grid numerical model of a pulsed combustion process. It employs a code originally developed and validated for wave rotors with non-reacting flow in uniform passages, and later extended to reacting flow, and non-uniform passages.

The code uses an Euler solver to integrate the governing equations of mass, momentum, energy, and species. It has the capability to accommodate multiple port boundary conditions at each end per cycle. It can model mixing, opening time and viscous losses, as well as those losses from leakage, heat transfer, and flow turning effects. It has now been modified to allow mass addition at any location and include the associated momentum and energy sources due to the presence of such mass sources. The governing equations are integrated for any specified time with cyclic boundary conditions. Inlet conditions are specified by appropriate stagnation quantities, and an outflow static pressure was prescribed. Net thrust or pressure gain was calculated based on the averaged outflow stagnation pressure. The code was tested with many parameters varied to check its suitability and capability. The code was tested with no mass addition and no area variation to verify simple pulse detonation cycle simulation. A stoichiometric hydrogen-air mixture with detonation initiated at the inlet end was considered.

Figure 9:
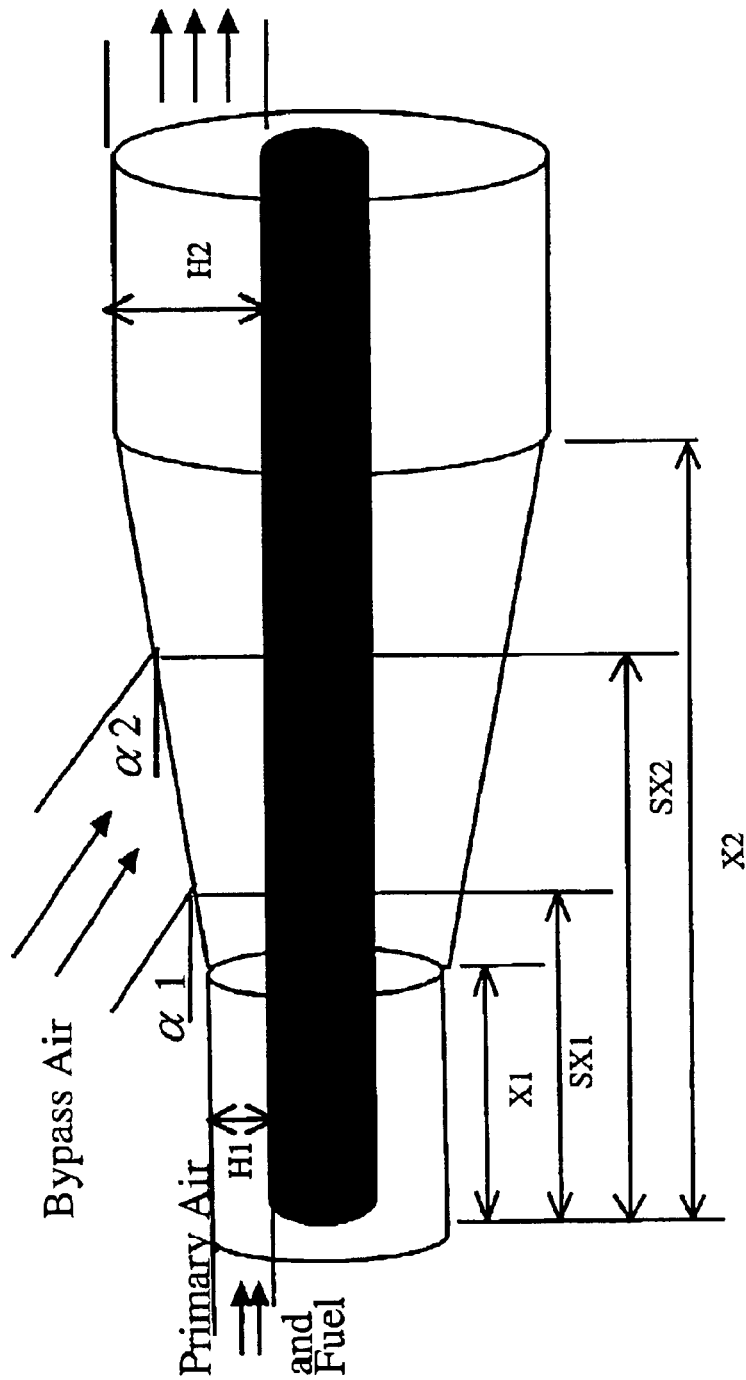
FIG. 9 schematically illustrates a diagram of a rotary ejector model used in a computational model of the performance of a rotary ejector wave rotor pulsed detonation engine.

FIG. 9 is a schematic diagram of the rotary ejector model, and Table I provides the geometric variables of FIG. 9. Although the transitional combustion passage 19 is shown as linear for simplicity, the model assumes a sinusoidal variation of passage height from the small, H1, to the larger, H2, diameter to provide a smooth transition. A range of spatial (geometry) and temporal (timing) design parameters was simulated in order to test the modified code. For the simulations reported here, a part of the tested range of cycle frequency and geometric parameters is used for illustrating performance. Based on a preliminary investigation over a range of parameters, an initial design was selected as given below. The selected geometric parameters are provided below, where L is the total rotor length and H1 is the forward combustion passage height.

TABLE 1

Passage Outflow Height, H2 = 2.0 H1
Area Transition Start Location, X1 = 0.2 L
Area Transition End Location, X2 = 0.5 L
Bypass Duct Start Location, SX1 = 0.3 L
Bypass Duct End Location, SX2 = 0.6 L
Bypass Duct Start Angle, $\alpha 1$ = 30°
Bypass Duct End Angle, $\alpha 2$ = 30°

The timings of the bypass port 633 were varied to study the effect of changing the entrained mass ratio of bypass air to inlet port air. Ideally, the timing was selected to best exploit the sub-atmospheric pressure in the channel induced as the exiting detonation was followed by discharge of high-momentum gas, and a reflected expansion wave. Care was taken to avoid significant backflow into the bypass port 633. In general as the open duration was increased, the entrained bypass air mass increased, and the inlet air mixture mass decreased as the internal pressures returned more rapidly to atmospheric conditions. Visual inspection for temperature, pressure and flow parameters in the contour diagrams were used to confirm the combustion mechanism, wave patterns, and the periodicity of the final solution.

The inlet port 632 was partitioned into five inlet zones of selected circumferential width, to allow for non-uniform mixtures. Typically, the first inlet zone was left unfueled to provide a non-combustible buffer, and had a width of 15% or 20% of the inlet port 632. There was also a very small port on the inlet side that was opened briefly to inject a small amount of hot gas to initiate the detonation.

The pressure ratio, thrust, and specific impulse augmentation were calculated for a limited range of design parameters. The outflow stagnation pressure was first computed by averaging the highly skewed outflow properties on a constant-area basis, while conserving mass, momentum and energy. This involved a loss as evidenced by an entropy increase upon transition to the subsonic solution for this calculation. The stagnation pressure was obtained for the average condition, and thrust was then computed by assuming an isentropic expansion of the product gas to atmospheric pressure. This approach resulted in an overly conservative estimate of thrust; the direct thrust force as measured by a momentum balance will always be higher. $I_{sp}$ was computed from the thrust and fuel mass flow rate.

The simulations explored exhaust port timing, exhaust port static pressure, and timing sequence of bypass and inlet ports 633, 632 to evaluate the impact on detonation and to enhance pressure gain or thrust. Based on inlet port pressure, exploration of the design space was begun by focusing on the choices of bypass and exhaust port timing. It has been confirmed that for the wave ejector and wave fan configurations with inlet port pressure not more than 1.2 times the bypass port pressure, the inlet port and bypass port durations may overlap, allowing for higher entrainment ratios. For these configurations, the exhaust port 634 may be open throughout the cycle. In contrast, for a wave fan configuration with inlet port pressure from 1.3 to 8 times the bypass port pressure, it was necessary to close the bypass port before opening the inlet port, and to close the exhaust port 634 for a part of the cycle to avoid performance degradation or backflow.

Wave Ejector PDE Cycle

Wave ejector performance was determined for a stationary naturally-aspirated hydrogen-air PDE in a sea-level atmospheric environment. The pressure gain, thrust, and $I_{sp}$ augmentation were calculated for a series of simulations over a limited range of design parameters.

FIGS. 10A–10E are illustrations of a typical hydrogen-air rotary-ejector-WRPDE cycle that shows the computed flow properties for a single cycle of operation. FIGS. 10A–10E are a series of plots of the cycle properties, presented as contour diagrams of temperature, pressure (log scale) and fuel concentration on a relative scale, and line plots of Mach number and pressure at selected locations. FIGS. 10A–10E show the relation between location, timings, and output for any typical single cycle. The x-axis was the location along the tube (x/L), and the y-axis was the elapsed time. The non-dimensional time was shown on the vertical axis, based on a reference wave transit time L/a*, where is a* is the reference sound speed (atmospheric). This correlates nominally with the number of transits over the full length of the rotor for reflections of the detonation wave. Qualitatively, the dark regions have the lowest values, while the lightest regions have the highest values.

The inlet port 632 and bypass port 633 were both at one atmosphere total pressure and standard atmospheric temperature. The exhaust port 634 remained open for the entire cycle at one atmosphere. The non-dimensional cycle time was set at 2.95, based again on a reference transit time for the full rotor length. This frequency was selected after some experimentation to match the detonation transit time and subsequent wave reflections in the forward passage.

Figures 10A, 10B:
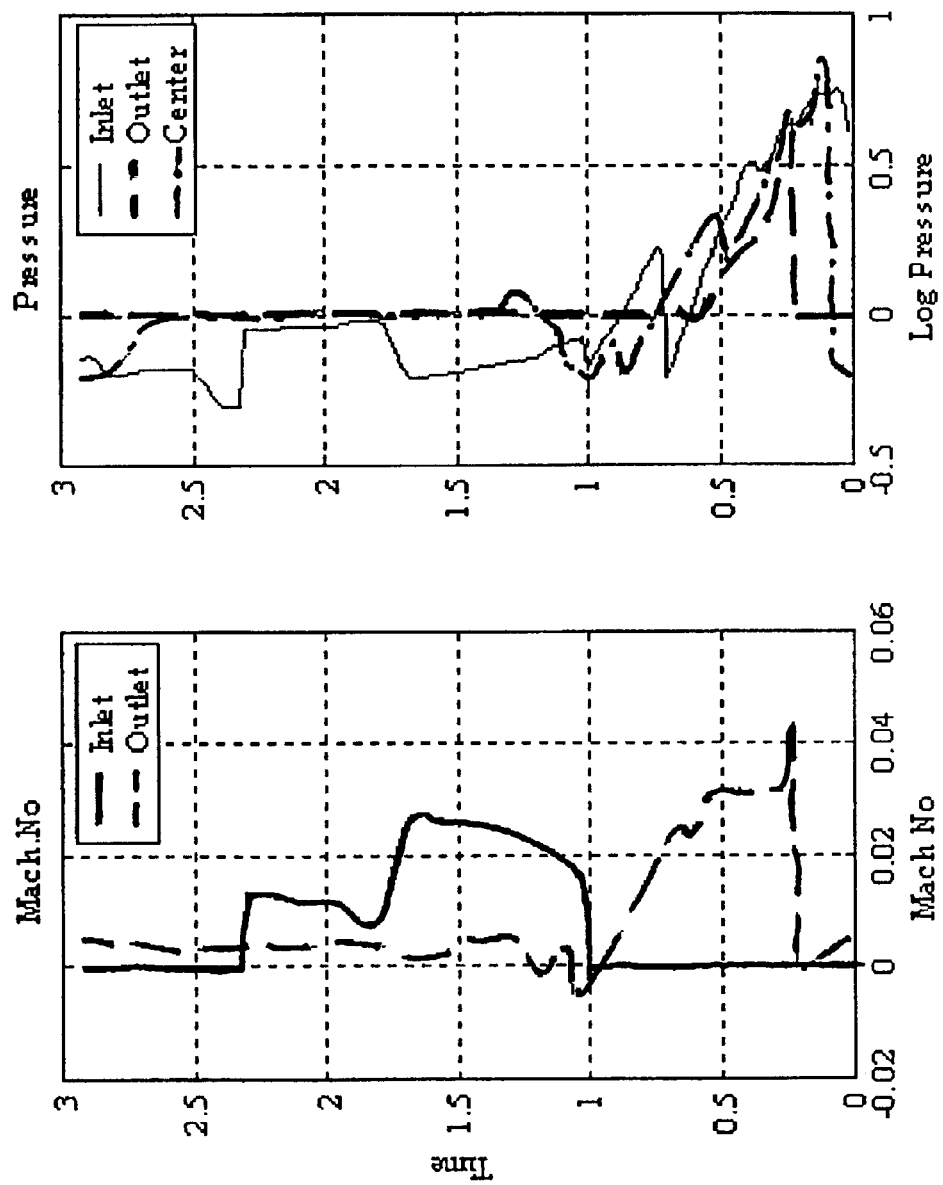
FIGS. 10A–10E illustrate, for a wave-ejector wave rotor pulsed detonation engine, plots of the cycle properties, temperature, pressure and fuel concentration on a relative scale, and line plots of Mach number and pressure at selected locations.
Figures 10C, 10D, 10E:
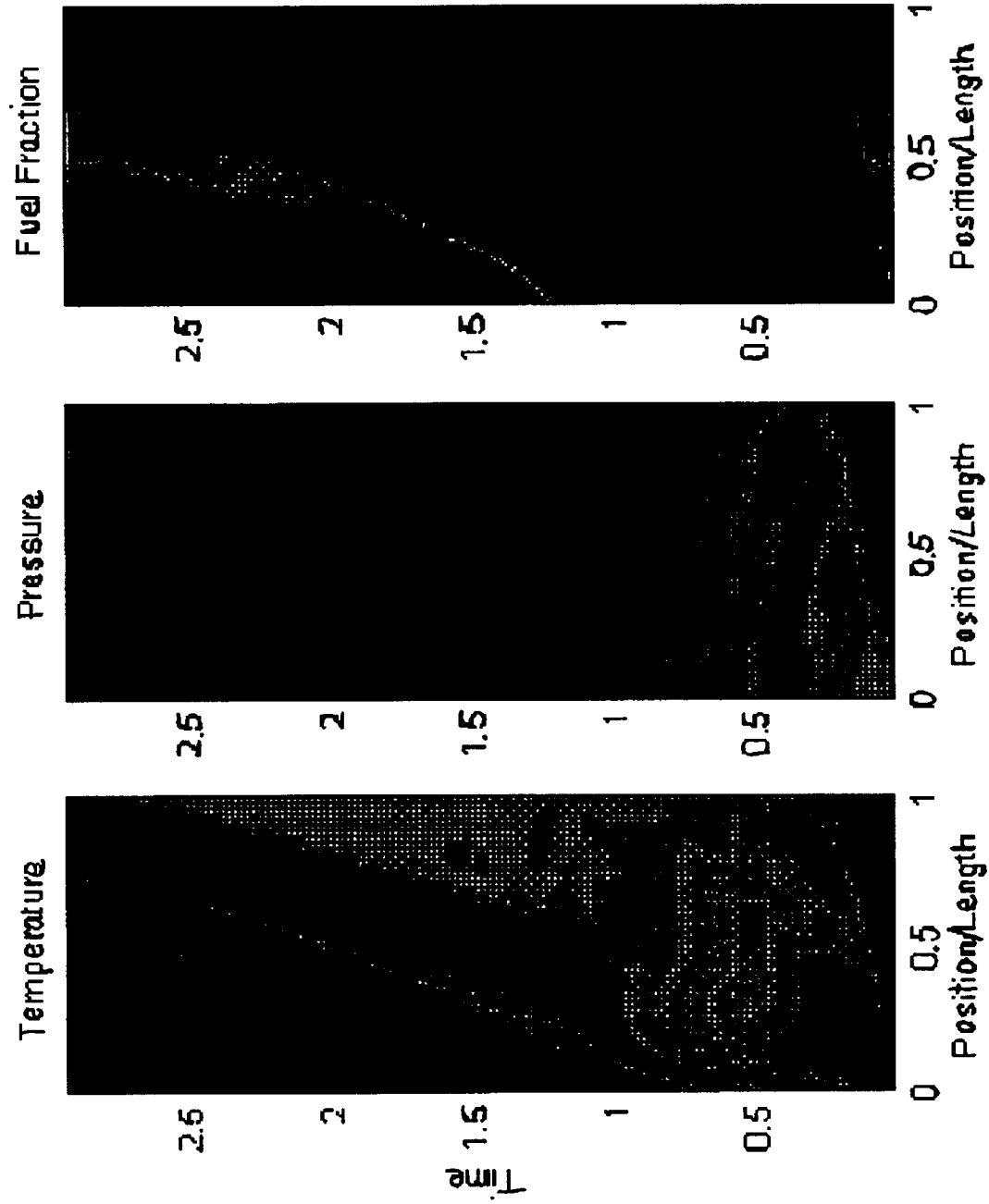
Figure 11B:
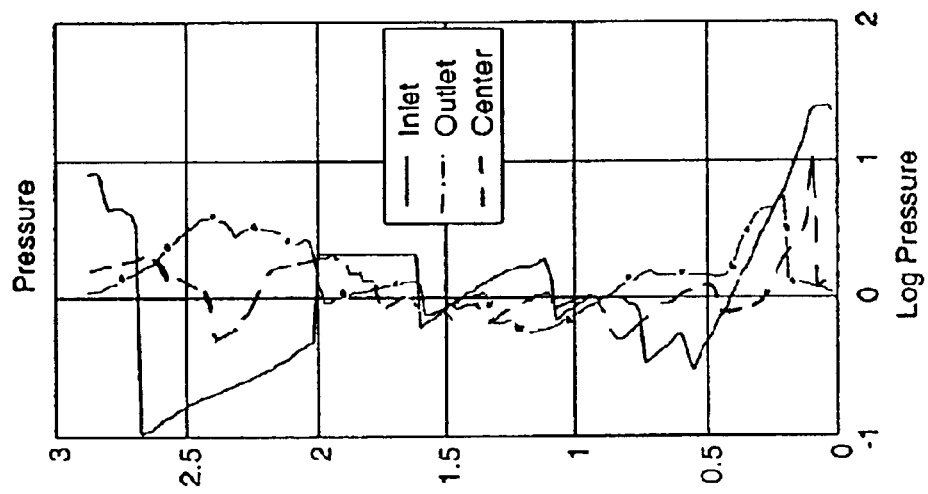
FIGS. 11A–11E illustrate, for a wave-fan wave rotor pulsed detonation engine, plots of the cycle properties, temperature, pressure and fuel concentration on a relative scale, and line plots of Mach number and pressure at selected locations.
Figure 11A:
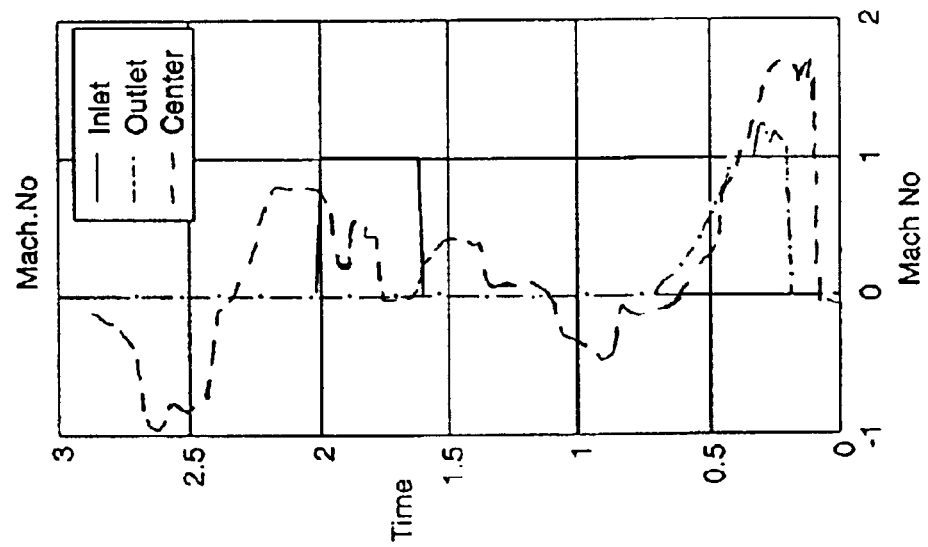
Figures 11C, 11D, 11E:
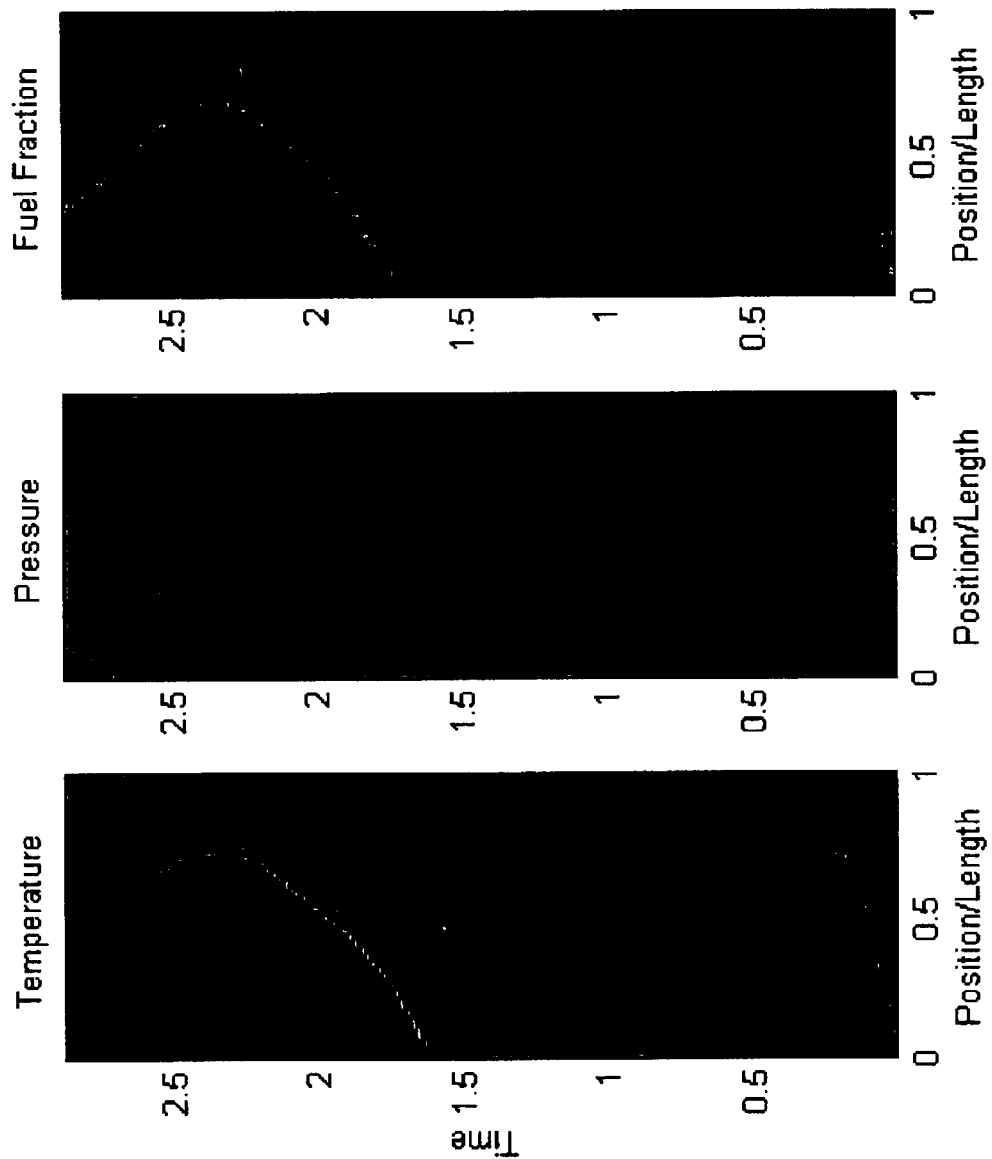

From the pressure-time diagram, the channel pressure was below atmospheric at the inlet port opening. Therefore, the fuel mixture flowed into the wave ejector and the inlet port 632 was timed to be open at 1.0 through 2.3. The subatmospheric pressure was the outcome of the wave reflection as shown in the pressure-position graph, FIG. 10B. The temperature-position plot, FIG. 10C, clearly shows the initial injection of colder (dark) bypass air beginning at time 1.0 along the length of the bypass inlet zone (0.3 to 0.55 in this example). The bypass flow terminated at time 2.6, but this was less evident as the flow rate diminishes and the inlet port air flow swept along the passage. The entrained air was 50% of total outflow. The $I_{sp}$ of the cycle was calculated to be 1.23 times that of a baseline simple PDE with no ejector and uniform passage height. This baseline PDE was operated at near-stoichiometric conditions in the combustible mixture, which completely fills the channel. The fuel fraction-position graph, FIG. 10E, shows the fuel concentration, gray indicating dilution by bypass air, from the full strength mixture which is shown in white.

For the wave ejector configuration, a number of simulations similar to the example were performed, while the timing of the bypass port flow was varied. The duration during which the bypass port 633 was open ranged from 1.6 to 2.95 L/a*. Other geometric and timing parameters were as given above, with the passage height ratio, H2/H1, maintained at 2.0. A range of values for entrainment ratio was obtained, and the performance was reported as a function of entrainment ratio or overall temperature ratio of exhaust gas to inlet air.

Figure 12:
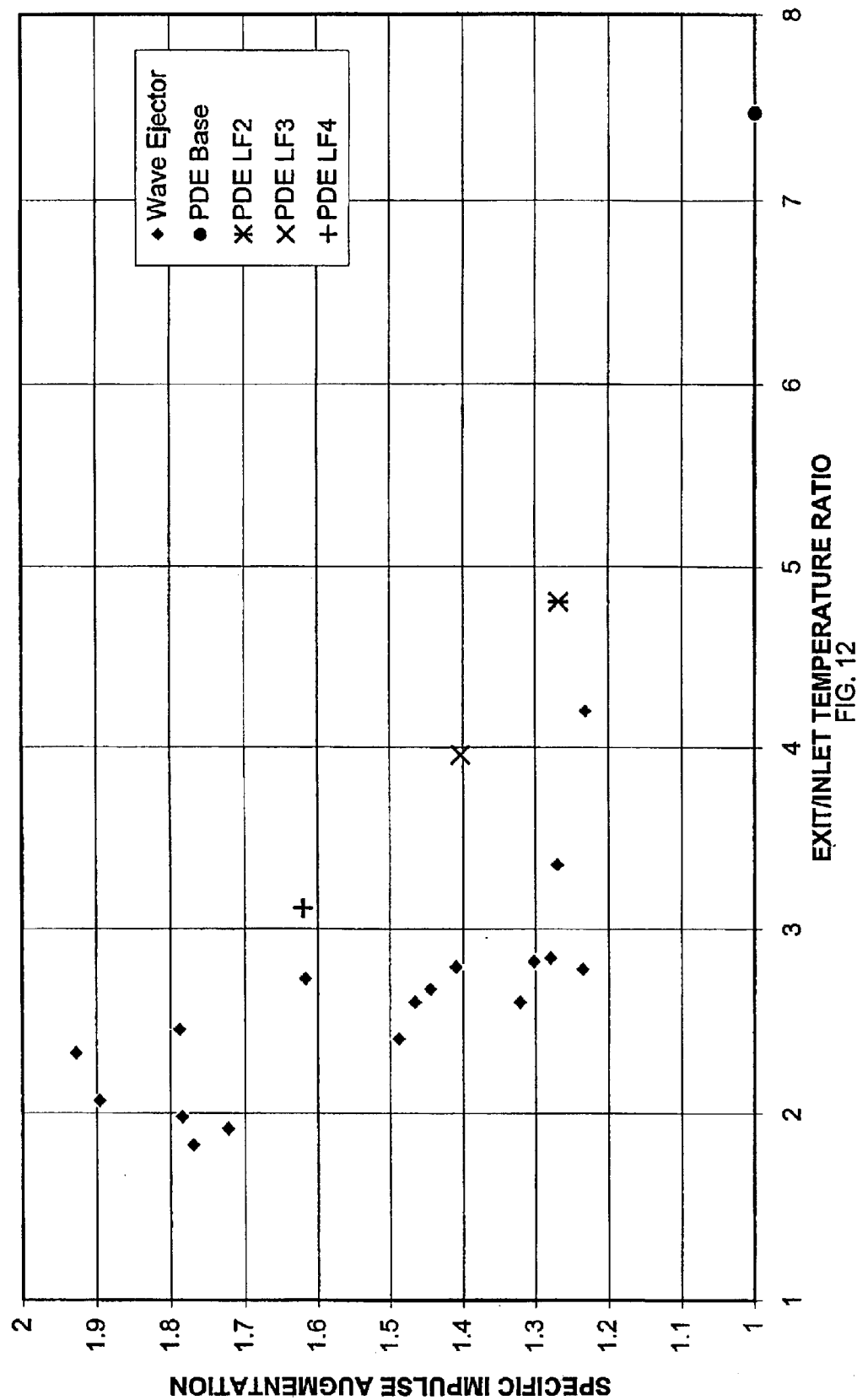
FIGS. 12–18 are plots illustrating the performance of wave-fan wave rotor pulsed detonation engines for differing design parameters as predicted by a computational model.

FIG. 12 is a graph of the $I_{sp}$ augmentation relative to the baseline PDE (PDE Base), plotted against the overall temperature ratio. The $I_{sp}$ can be nearly doubled with sufficient bypass air entrainment to reduce the overall temperature ratio from about 7.5 for the baseline to about 2.0. As a point of comparison, additional simulations were performed of a straight channel PDE with partial fueling, which is also a means of augmenting $I_{sp}$. These cases are shown as LF2, LF3, and LF4 in FIG. 12, for partial fueling up to levels that are believed to be feasible while retaining detonable mixtures and reasonable overall tube length. The fueling levels were 100%, 64%, 52%, and 41%, for the baseline, LF2, LF3, and LF4, respectively. For similar levels of non-combustible air mass (as measured by exit temperature), the $I_{sp}$ augmentation is apparently better for the straight channel PDE. This reflects the fact that the wave ejector model imparts a momentum loss to air entrained based on the incidence angle. It is expected that the wave ejector will remain competitive for its high entrainment capability with compact geometry.

Passage Height Effect

It is believed that the choice of geometric parameters will have a significant influence on performance. As a first step in the direction of studying these effects, simulation results for different height ratios were studied. The exhaust port height to inlet height ratio (HR=H2/H1) was varied from 1.2 up to 2.5. The bypass port entrance location and other geometric parameters were the same in all cases. Different entrainment ratios were obtained by varying the bypass port opening and closing timings.

Figure 13:
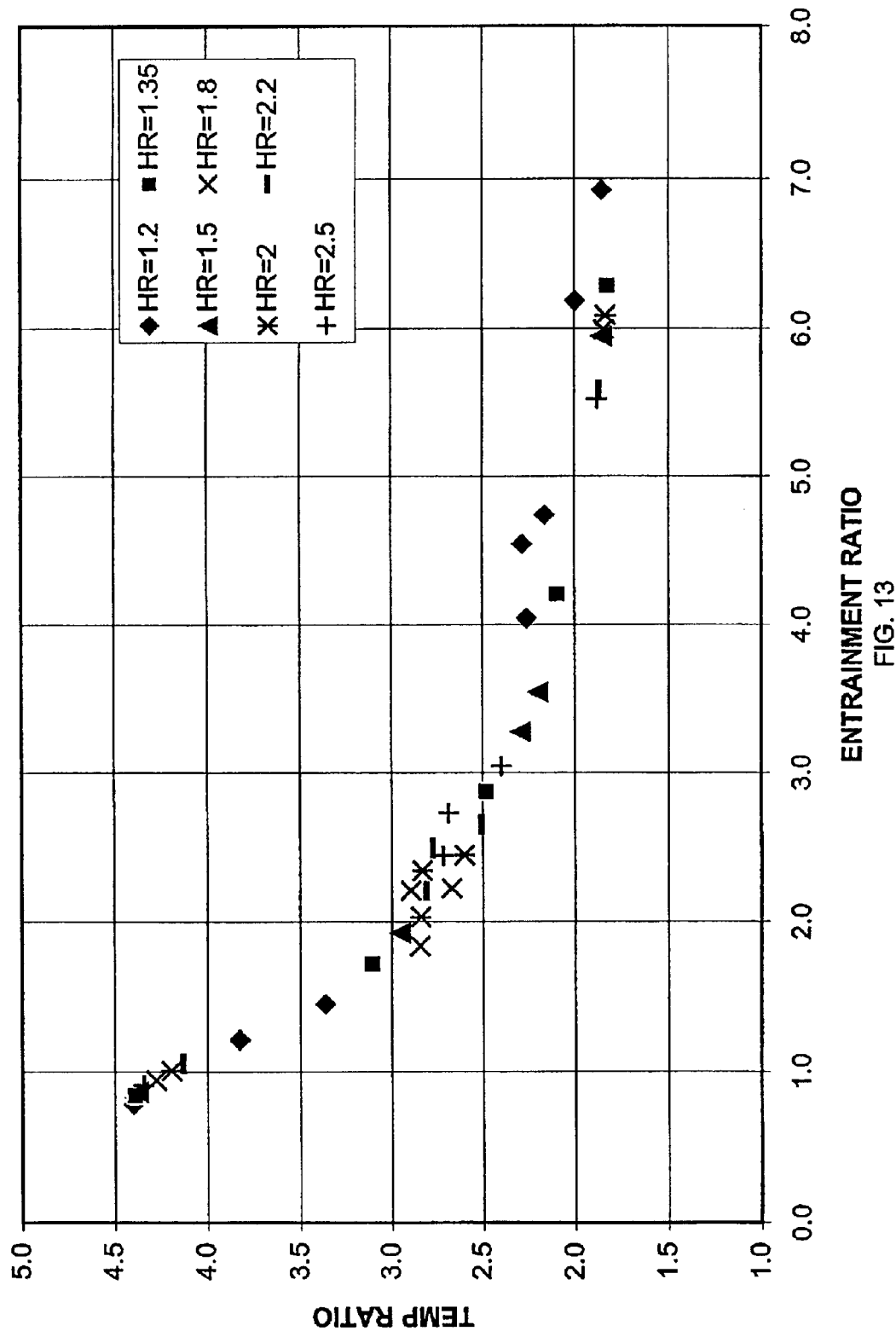
Figure 14:
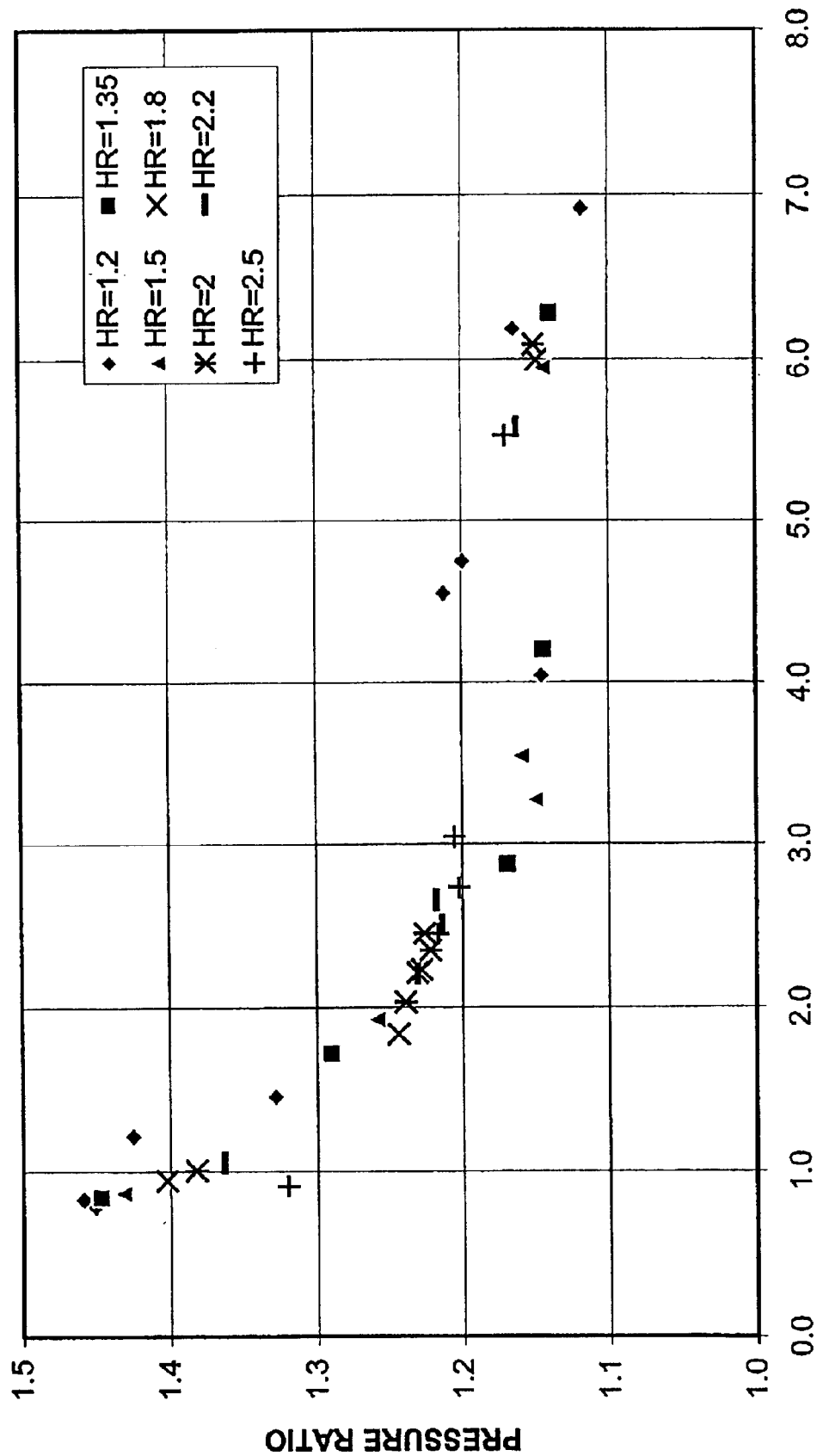
Figure 15:
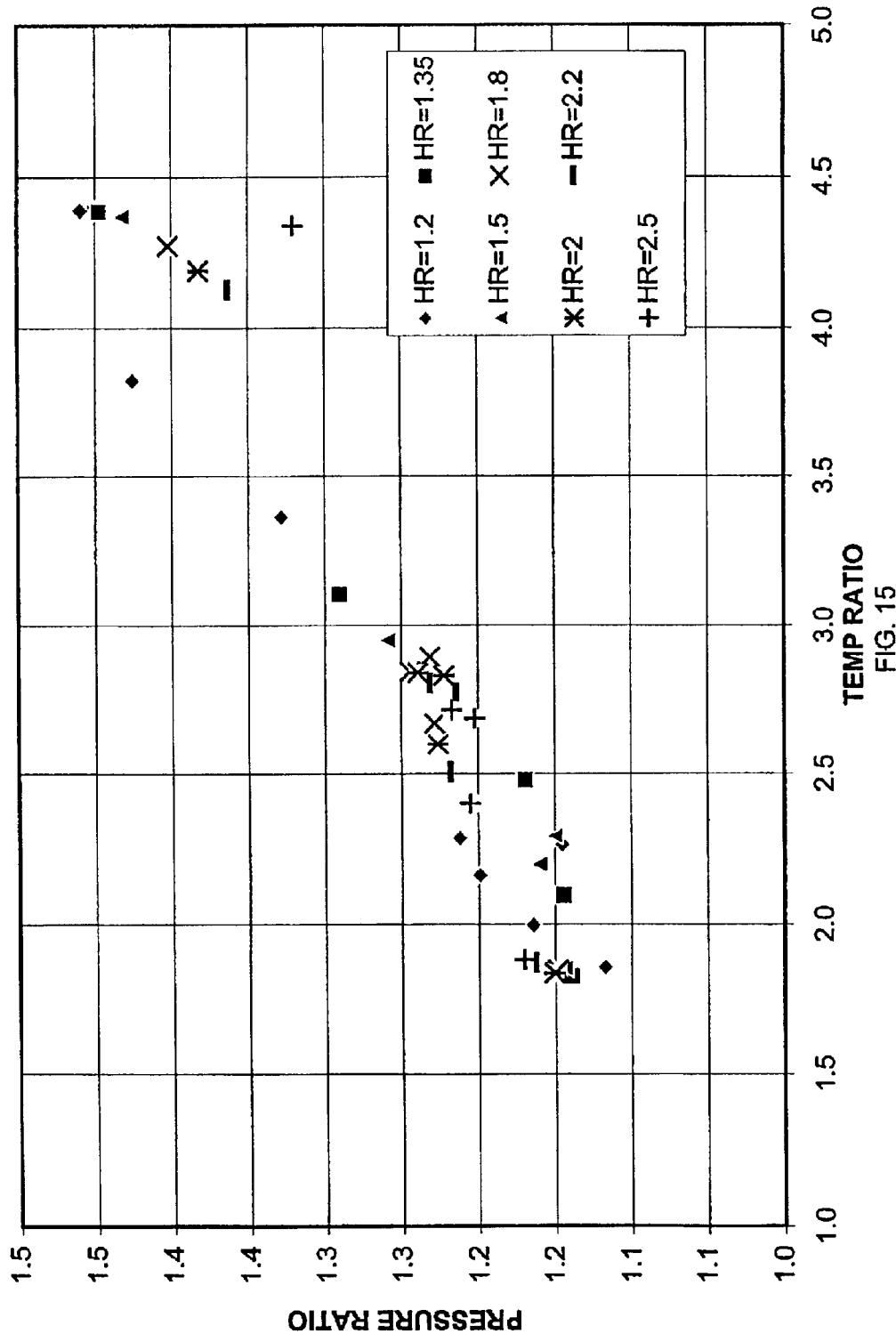
Figure 16:
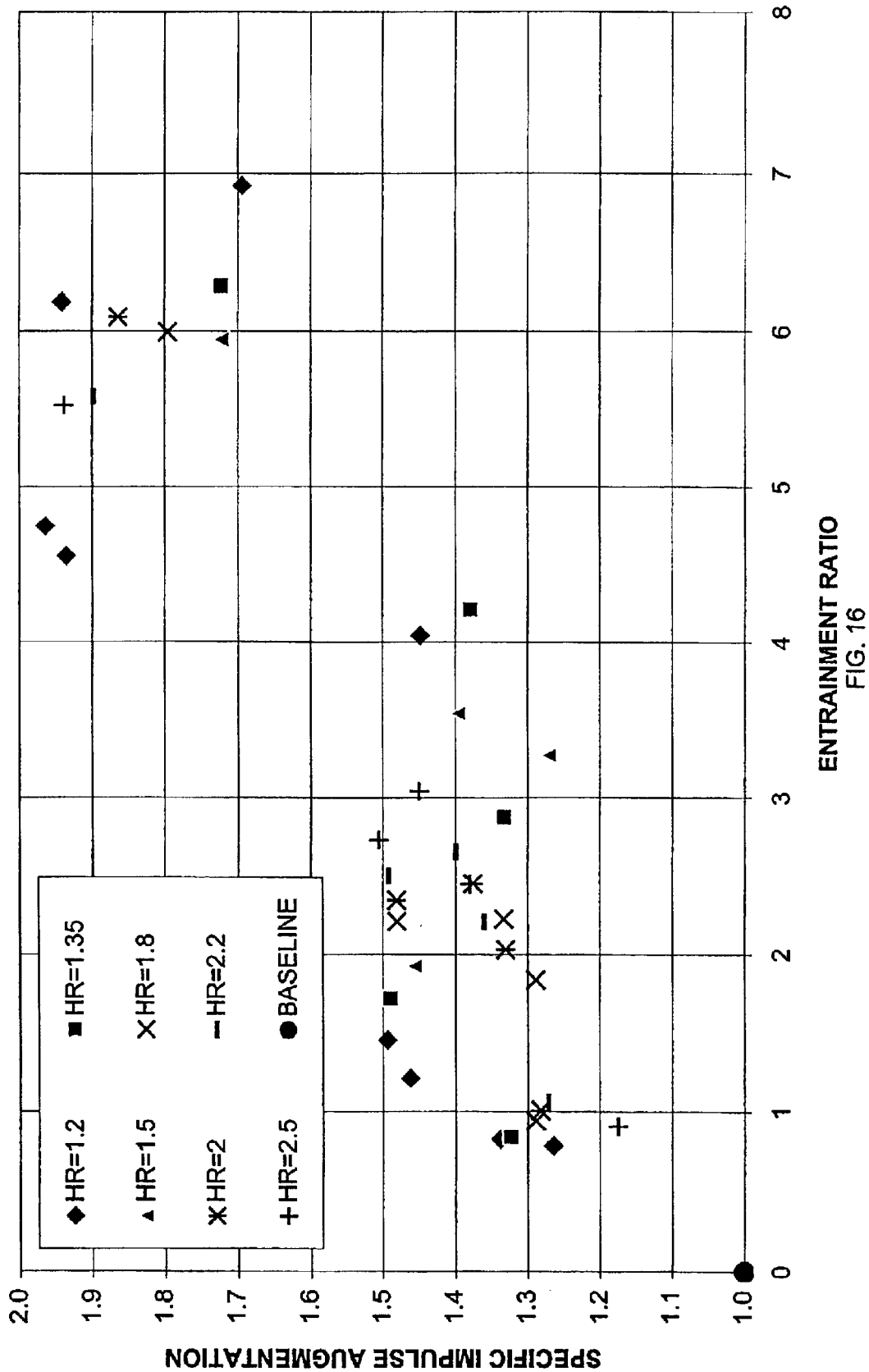

For verification of overall energy conservation, FIG. 13 is a plot of temperature ratio vs entrainment ratio. Because average inlet stoichiometry fluctuates with pressure waves that affect the relative buffer gas width, precise correlation is not expected. FIG. 14 presents the variation of overall pressure ratio with entrainment ratio, and FIG. 15 presents the variation of pressure ratio with temperature ratio. The latter is a familiar representation of the performance of pressure gain combustors. FIG. 16 is the Specific Impulse vs Entrainment Ratio.

While these results are consistent with the above studies with a fixed height ratio, they provide only a qualitative indication of the effect of HR on performance, which appears to be significant. It should be considered that the effect of height ratio could be very complex, as it affects the propagation and strengths of all pressure waves, as well as the momentum concentration due to injected mass and the flow diffusion. The general lesson at this time is that the effect of all geometric parameters must be studied further more systematically, and that there is significant potential for performance improvement by careful optimization of these parameters.

Wave Fan PDE Cycle

For a wave-fan-WRPDE configuration, the bypass port pressure was set equal to one atmosphere, and temperature equal to the standard atmospheric temperature. The inlet port total pressure was set higher than the atmospheric pressure (the bypass pressure), with a correspondingly higher total temperature. Other conditions such as partitioning for purge air and mixture were very similar to the above wave ejector case, as was the ignition method. The exhaust port 634 was not open for the entire cycle if the inlet port pressure exceeded 1.2. The exhaust port 634 was closed for a timed period to prevent backflow, avoid pressure loss during the inlet port period, and ensure the proper discharge of the detonation traveling waves.

FIGS. 11A–11E are illustrations of a typical Wave Fan PDE Cycle that shows the computed flow properties for a single cycle of operation. The inlet port total pressure was set equal to 4.0. The non-dimensional cycle time was set at 2.95, based again on a reference transit time for the full rotor length. The inlet port 632 was open from 1.6 to 2.0. The bypass port 633 was open from 0.1 to 0.5. The exhaust port 634 was open from 0.2 to 0.7. The performance of the wave fan may best be measured by the total exit pressure to the work extraction device (turbine). Therefore, the Pressure Ratio was defined as the ratio of exit total pressure to bypass port total pressure, and was computed for several cases. These cases involved inlet port to bypass port pressure ratios from 1.0 (same as wave ejector) to 8.0, with most of the simulations using values in the range of 1.2 to 4.0.

Figure 17:
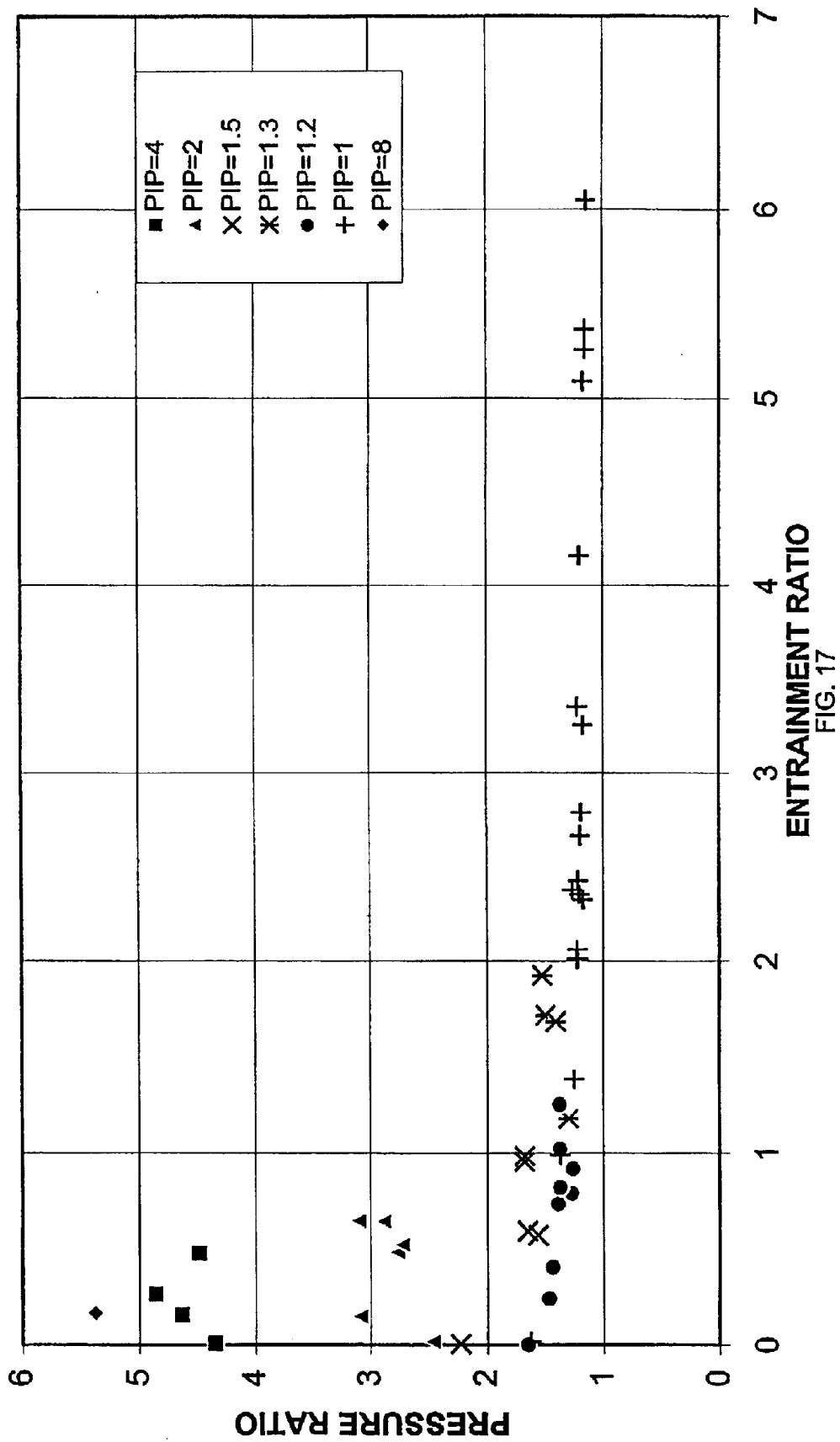
Figure 18:
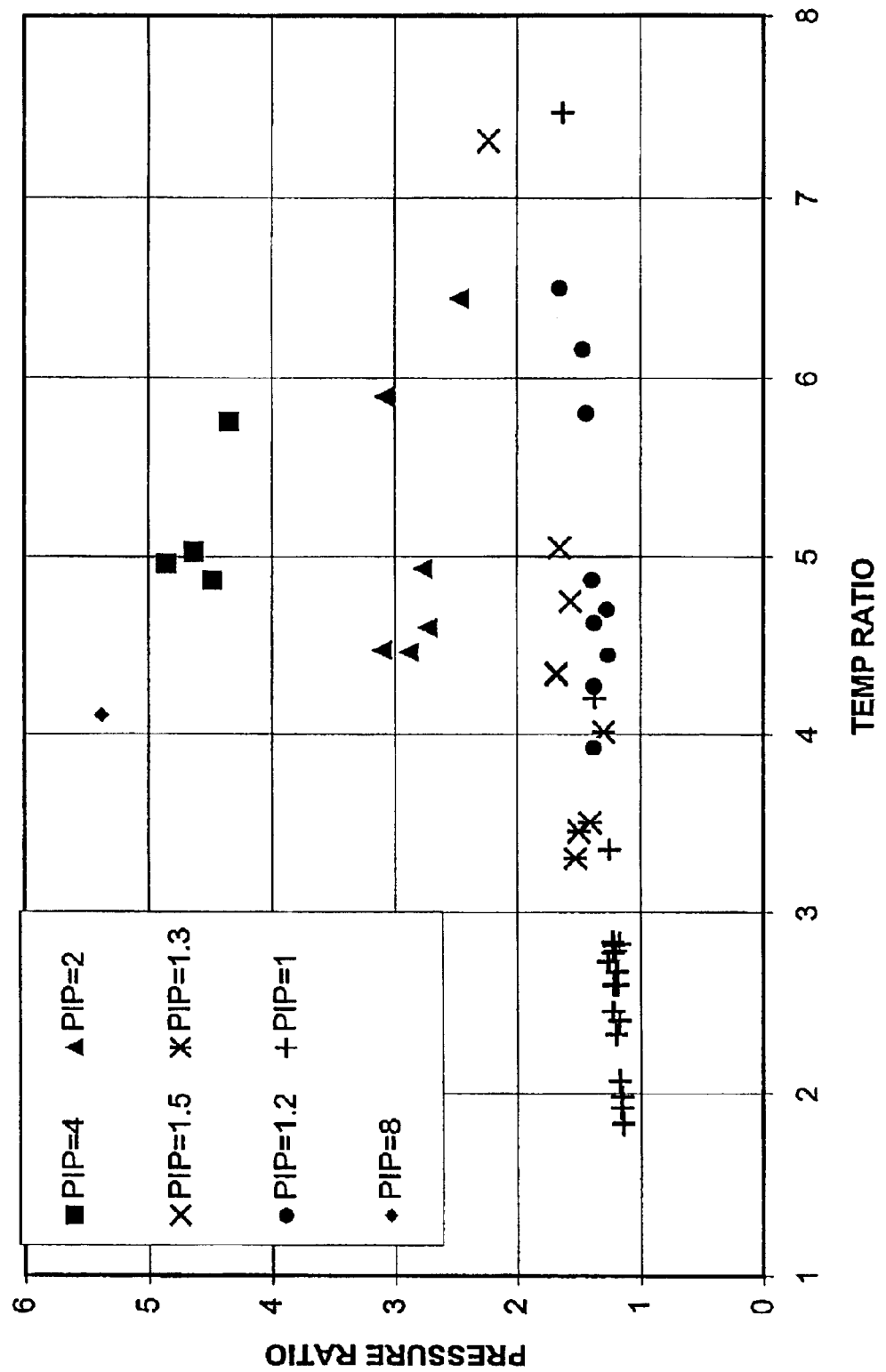

FIG. 17 shows the Pressure Ratio vs. Entrainment Ratio for differing values of the inlet port pressure (PIP); FIG. 18 shows the Pressure Ratio vs. Temperature Ratio for differing values of the inlet port pressure (PIP). Temperature Ratio is defined as the exit total temperature divided by bypass port total temperature. As a preliminary finding, it appears from the simulations that there is relatively good performance for inlet port to bypass port pressure ratios around 2.0, and the effectiveness of the device diminishes for higher pressure differences due to the limited entrainment possible.

These and other advantages of the present invention will be apparent to those skilled in the art from the foregoing specification. Accordingly, it will be recognized by those skilled in the art that changes or modifications may be made to the above-described configurations without departing from the broad inventive concepts of the invention. It should therefore be understood that this invention is not limited to the particular configurations described herein, but is intended to include all changes and modifications that are within the scope and spirit of the invention as set forth in the claims.

What is claimed is:

1. A rotary ejector enhanced pulse detonation engine, comprising:

a housing having at least one inlet port and at least one exhaust port; and a rotor mounted within the housing and adapted to support on-rotor combustion, comprising:
  i) a plurality of forward combustion passages adapted to support combustion of a detonable mixture therein, the forward combustion passages having an inlet end for gaseous communication with the inlet port for receiving a detonable mixture from the inlet port;
  ii) a plurality of rear combustion passages disposed in gaseous communication with the forward combustion passages, the rear combustion passages having an outlet end for expelling combustion products; and
  iii) a plurality of transitional combustion passages joining the forward combustion passages to the rear combustion passages in gaseous communication, the transitional combustion passages adapted to communicate with a source of bypass gas to provide a rotary ejector.

2. The engine according to claim 1 wherein the rear combustion passages have a radial height different from the radial height of the forward combustion passages.

3. The engine according to claim 2 wherein the transitional combustion passages have a radial height at a first end equal to the radial height of the adjoining forward combustion passages and have a radial height at a second end equal to the radial height of the adjoining rear combustion passages.

4. The engine according to claim 3 wherein the radial height at the second end of the transitional combustion passages is greater than the radial height at the first end of the transitional combustion passages.

5. The engine according to claim 1 wherein two or more selected forward combustion passages gaseously communicate with a single selected rear combustion passage.

6. The engine according to claim 1 wherein two or more selected forward combustion passages gaseously communicate with a single selected transitional combustion passage.

7. The engine according to claim 1 wherein the length of the forward combustion passage is 20 percent of the sum of the lengths of the forward combustion passage, transitional combustion passage, and rear combustion passage.

8. The engine according to claim 1 wherein the length of the rear combustion passage is 50 percent of the sum of the lengths of the forward combustion passage, the transitional combustion passage, and the rear combustion passage.

9. The engine according to claim 1 wherein the transitional combustion passages have a radial height that increases in a linear fashion along at least a portion of the length of the transitional combustion passage.

10. The engine according to claim 1 wherein the transitional combustion passages have a radial height that varies in a non-linear fashion along at least a portion of the length of the transitional combustion passage.

11. The engine according to claim 1 wherein the transitional combustion passages are partially unshrouded.

12. The engine according to claim 1 wherein the transitional combustion passages are unshrouded.

13. The engine according to claim 1 wherein the rear combustion passages are unshrouded.

14. The engine according to claim 1 comprising a bypass port for supplying the source of bypass gas, the bypass port located at a position such that none of the transitional combustion passages are in simultaneous gaseous communication with the bypass port and the inlet port.

15. The engine according to claim 1 wherein the inlet port comprises a plurality of inlet zones disposed at the inlet port at differing angular positions to provide for successive communication between the inlet zones and the forward combustion passages as the rotor rotates, thereby providing for stratification of combustible materials within the forward combustion passages.

16. The engine according to claim 15 wherein the plurality of inlet zones comprises a first inlet zone having a fuel injector.

17. The engine according to claim 16 wherein the plurality of inlet zones comprises a second inlet zone being solely an inlet for a noncombustible gas without a fuel injector.

18. The engine according to claim 17 wherein the second inlet zone is disposed within the inlet port at a location such that at the start of a combustion cycle the forward combustion passages rotate into communication with the second inlet zone prior to rotating into communication with any other inlet zone.

19. The engine of claim 17 wherein opening of the outlet end of the rear combustion passage produces an expansion wave traveling towards the inlet end of the forward combustion passage, and wherein the pulse detonation engine comprises a timing means for rotating the rotor such that the expansion wave arrives at the inlet end of the forward combustion passage as the inlet end rotates into communication with the second inlet zone.

20. The engine of claim 17 wherein opening of the outlet end of the rear combustion passage produces an expansion wave traveling towards the inlet end of the forward combustion passage, and wherein the pulse detonation engine comprises a timing means for rotating the rotor such that the expansion wave arrives at the transitional combustion passage as the transitional combustion passage rotates into communication with the source of bypass gas.

21. The engine according to claim 17 wherein the plurality of inlet zones comprises a third inlet zone intermediate to the first and second inlet zones, the third inlet zone having a fuel injector.

22. The engine according to claim 17 wherein the first inlet zone comprises an enhancement injector for delivering a combustion enhancer into a selected passage in gaseous communication with the first inlet zone.

23. The engine according to claim 22 wherein the first inlet zone is disposed within the inlet port at a location such that for each combustion cycle the forward combustion passages rotate into communication with the first inlet zone after rotating into communication with the other inlet zones.

24. The engine according to claim 1 wherein the at least one inlet port has a first circumferential width and the at least one exhaust port has a second circumferential width, the first circumferential width and the second circumferential width being substantially equal.

25. The engine according to claim 1 wherein about ½ of the forward combustion passages are in simultaneous gaseous communication with the at least one inlet port.

26. The engine according to claim 1 wherein about ½ of the rear combustion passages are in simultaneous gaseous communication with the at least one exhaust port.

27. The engine according to claim 1 wherein about ¼ of the forward combustion passages and associated rear combustion passages communicating therewith are simultaneously in communication with both the at least one exhaust port and the at least one inlet port.

28. The engine according to claim 1 wherein all of the rear combustion passages are disposed in simultaneous gaseous communication with the at least one exhaust port.

29. The engine according to claim 1 wherein the at least one inlet port subtends a circumferential width of about 180 degrees.

30. The engine according to claim 1 wherein the at least one exhaust port subtends a circumferential width of about 180 degrees.

31. The engine according to claim 1 wherein the at least one inlet port subtends a first circumferential width and the at least one exhaust port subtends a second circumferential width, the first circumferential width and the second circumferential width subtending a region of circumferential overlap of about 90 degrees.

32. The engine according to claim 1 wherein the at least one inlet port subtends a first circumferential width and the at least one exhaust port subtends a second circumferential width, the first circumferential width and the second circumferential width subtending a region of circumferential overlap of about ½ the first circumferential width.

33. The engine according to claim 32 wherein the first circumferential width is defined by a first leading-edge and a first trailing edge and the second circumferential width is defined by a second leading-edge and a second trailing edge, and wherein the region of overlap is disposed between the first leading-edge and the second trailing edge.

34. The engine according to claim 1 wherein the at least one inlet port subtends a circumferential width of about 90 degrees.

35. The engine according to claim 1 wherein the at least one exhaust port subtends a circumferential width of about 90 degrees.

36. The engine according to claim 1 wherein the number of inlet ports equals the number of exhaust ports.

37. The engine according to claim 1 having one inlet port and one exhaust port.

38. The engine according to claim 1 having a first and a second inlet port and a first and a second exhaust port.

39. The engine according to claim 38 wherein each inlet port and each exhaust port subtends a circumferential width of about 90 degrees.

40. The engine according to claim 38 wherein the first inlet port and the first exhaust port subtend a region of circumferential overlap of about 45 degrees and the second inlet port and the second exhaust port subtend a region of circumferential overlap of about 45 degrees.

41. The engine according to claim 1 comprising at least one igniter, each igniter disposed proximate a respective inlet port such that each igniter communicates with the forward combustion passages just after the forward combustion passages have rotated past the respective inlet port.

42. The engine according to claim 41 wherein the number of igniters equals the number of exhaust ports.

43. The engine according to claim 42 wherein each igniter is disposed proximate a respective exhaust port such that each igniter communicates with the rear combustion passages just after the rear combustion passages have rotated past the respective exhaust port.

44. The engine of claim 41 wherein firing of the igniter produces a detonative shock wave traveling towards the outlet end of the rear combustion passage, and wherein the pulse detonation engine comprises a timing means for rotating the rotor such that the shock wave arrives at the outlet end of the rear combustion passage as the outlet end rotates into communication with the at least one exhaust port.

45. The engine of claim 1 wherein closure of the outlet end of the rear combustion passage produces a compression wave traveling towards the inlet end of the forward combustion passage, and wherein the pulse detonation engine comprises a timing means for rotating the rotor such that the compression wave arrives proximate a first wall of the housing at which the inlet port is disposed immediately after firing of the igniter.

46. A rotary ejector enhanced pulse detonation engine, comprising:
at least one inlet port;
a rotor mounted within the housing and adapted to support on-rotor combustion, comprising:
i) a plurality of forward combustion passages adapted to support combustion of a detonable mixture therein, the forward combustion passages having an inlet end for gaseous communication with the inlet port for receiving a detonable mixture from the inlet port, and
ii) a plurality of rear combustion passages disposed in gaseous communication with the forward combustion passages, the rear combustion passages having an outlet end for expelling combustion products, the rear combustion passages having a radial height different from the radial height of the forward combustion passages; and
a rotary ejector comprising a plurality of transitional combustion passages joining the forward combustion passages to the rear combustion passages in gaseous communication.

47. The engine according to claim 46 wherein the transitional combustion passages have a radial height at a first end equal to the radial height of the adjoining forward combustion passages and have a radial height at a second end equal to the radial height of the adjoining rear combustion passages.

48. The engine according to claim 47 wherein the radial height at the second end of the transitional combustion passages is greater than the radial height at the first end of the transitional combustion passages.

49. The engine according to claim 46 wherein two or more selected forward combustion passages gaseously communicate with a single selected rear combustion passage.

50. The engine according to claim 46 wherein two or more selected forward combustion passages gaseously communicate with a single selected transitional combustion passage.

51. The engine according to claim 46 wherein the length of the forward combustion passage is 20 percent of the sum of the lengths of the forward combustion passage, transitional combustion passage, and rear combustion passage.

52. The engine according to claim 46 wherein the length of the rear combustion passage is 50 percent of the sum of the lengths of the forward combustion passage, the transitional combustion passage, and the rear combustion passage.

53. The engine according to claim 46 wherein the transitional combustion passages have a radial height that increases in a linear fashion along at least a portion of the length of the ejector.

54. The engine according to claim 46 wherein the transitional combustion passages have a radial height that varies in a non-linear fashion along at least a portion of the length of the transitional combustion passage.

55. The engine according to claim 46 wherein the transitional combustion passages are partially unshrouded.

56. The engine according to claim 46 wherein the transitional combustion passages are unshrouded.

57. The engine according to claim 46 wherein the rear combustion passages are unshrouded.

58. The engine according to claim 46 wherein the inlet port comprises a plurality of inlet zones disposed at the inlet port at differing angular positions to provide for successive communication between the inlet zones and the forward combustion passages as the rotor rotates, thereby providing for stratification of combustible materials within the forward combustion passages.

59. A rotary ejector enhanced pulse detonation engine, comprising:
   at least one inlet port within a housing;
   a rotor mounted within the housing and adapted to support on-rotor combustion;
   a plurality of passageways extending through the rotor, each passageway comprising:
   i) a forward combustion passage at the inlet end of the passageway, the forward combustion passage adapted to support combustion of a detonable mixture therein and having an inlet end for gaseous communication with the inlet port for receiving a detonable mixture from the inlet port;
   ii) a rear combustion passage disposed in gaseous communication with the forward combustion passage, the rear combustion passage having an outlet end for expelling combustion products; and
   iii) a transitional combustion passage joining the forward combustion passage to the rear combustion passage in gaseous communication, the transitional combustion passage adapted to communicate with a source of bypass gas to provide a rotary ejector.

60. The engine according to claim 59 wherein the rear combustion passage has a radial height different from the radial height of the forward combustion passage.

61. The engine according to claim 59 wherein the transitional combustion passage has a radial height at a first end equal to the radial height of the adjoining forward combustion passage and has a radial height at a second end equal to the radial height of the adjoining rear combustion passage.

62. The engine according to claim 61 wherein the radial height at the second end of the transitional combustion passage is greater than the radial height at the first end of the transitional combustion passage.

63. The engine according to claim 59 wherein two or more selected forward combustion passages gaseously communicate with a single selected rear combustion passage.

64. The engine according to claim 59 wherein two or more selected forward combustion passages gaseously communicate with a single selected transitional combustion passage.

65. The engine according to claim 59 wherein the length of the forward combustion passage is 20 percent of the length of the passageway.

66. The engine according to claim 59 wherein the length of the rear combustion passage is 50 percent of the length of the passageway.

67. The engine according to claim 59 wherein the passageway has a radial height that increases in a linear fashion along at least a portion of the length of the passageway.

68. The engine according to claim 59 wherein the passageway has a radial height that varies in a non-linear fashion along at least a portion of the length of the passageway.

69. The engine according to claim 59 wherein the transitional combustion passage is partially unshrouded.

70. The engine according to claim 59 wherein the transitional combustion passage is unshrouded.

71. The engine according to claim 59 wherein the rear combustion passage is unshrouded.

72. The engine according to claim 59 wherein the inlet port comprises a plurality of inlet zones disposed at the inlet port at differing angular positions to provide for successive communication between the inlet zones and the passageways as the rotor rotates, thereby providing for stratification of combustible materials within the passageways.

73. The engine according to claim 59 wherein the rotor comprises a cylindrical outer shroud defining an outer surface of the rotor, a cylindrical hub, and rotor vanes extending from the cylindrical hub to the outer shroud whereby the passageways are formed.

74. The engine of claim 73 wherein the rotor vanes lie along the radial direction of the rotor.

75. The engine of claim 73 wherein the rotor vanes are straight.

76. The engine of claim 73 wherein the rotor vanes are curved in a plane perpendicular to a longitudinal axis of the rotor.

77. The engine of claim 59 wherein the combustion passageways are helically disposed about a longitudinal axis of the rotor.

78. The engine according to claim 59 wherein the passageways have a substantially rectangular cross section in a plane containing a longitudinal axis of the rotor.

79. The engine according to claim 59 wherein the passageways have a substantially rectangular cross section in a plane perpendicular to a longitudinal axis of the rotor.

80. The engine according to claim 59 wherein the passageways have a substantially circular cross section in a plane perpendicular to a longitudinal axis of the rotor.

81. An ejector wave rotor for use in a rotary ejector enhanced pulse detonation engine, comprising:
   a plurality of passageways extending through the rotor, each passageway comprising:
   i) a forward combustion passage at the inlet end of the passageway, the forward combustion passage adapted to support combustion of a detonable mixture therein and having an inlet end for receiving a detonable mixture;
   ii) a rear combustion passage disposed in gaseous communication with the forward combustion passage, the rear combustion passage having an outlet end for expelling combustion products; and
   iii) a transitional combustion passage joining the forward combustion passage to the rear combustion passage in gaseous communication, the transitional combustion passage adapted to communicate with a source of bypass gas to provide a rotary ejector.

82. The rotor according to claim 81 wherein the rear combustion passage has a radial height different from the radial height of the forward combustion passage.

83. The rotor according to claim 82 wherein the rear combustion passage has a radial height greater than the radial height of the forward combustion passage.

84. The rotor according to claim 81 wherein the transitional combustion passage has a radial height at a first end equal to the radial height of the adjoining forward combustion passage and has a radial height at a second end equal to the radial height of the adjoining rear combustion passage.

85. The rotor according to claim 84 wherein the radial height at the second end of the transitional combustion passage is greater than the radial height at the first end of the transitional combustion passage.

86. The rotor according to claim 81 wherein two or more selected forward combustion passages gaseously communicate with a single selected rear combustion passage.

87. The rotor according to claim 81 wherein two or more selected forward combustion passages gaseously communicate with a single selected transitional combustion passage.

88. The rotor according to claim 81 wherein the length of the forward combustion passage is 20 percent of the length of the passageway.

89. The rotor according to claim 81 wherein the length of the rear combustion passage is 50 percent of the length of the passageway.

90. The rotor according to claim 81 wherein the passageway has a radial height that increases in a linear fashion along at least a portion of the length of the passageway.

91. The rotor according to claim 81 wherein the passageway has a radial height that varies in a non-linear fashion along at least a portion of the length of the passageway.

92. The rotor according to claim 81 wherein the transitional combustion passage is partially unshrouded.

93. The rotor according to claim 81 wherein the transitional combustion passage is unshrouded.

94. The rotor according to claim 81 wherein the rear combustion passage is unshrouded.

95. The rotor according to claim 81 wherein the rotor comprises a cylindrical outer shroud defining an outer surface of the rotor, a cylindrical hub, and rotor vanes extending from the cylindrical hub to the outer shroud whereby the passageways are formed.

96. The rotor of claim 95 wherein the rotor vanes lie along the radial direction of the rotor.

97. The rotor of claim 95 wherein the rotor vanes are straight.

98. The rotor of claim 95 wherein the rotor vanes are curved in a plane perpendicular to a longitudinal axis of the rotor.

99. The rotor of claim 81 wherein the combustion passageways are helically disposed about a longitudinal axis of the rotor.

100. The rotor according to claim 59 wherein the passageways have a substantially rectangular cross section in a plane containing a longitudinal axis of the rotor.

101. The rotor according to claim 59 wherein the passageways have a substantially rectangular cross section in a plane perpendicular to a longitudinal axis of the rotor.

102. The rotor according to claim 59 wherein the passageways have a substantially circular cross section in a plane perpendicular to a longitudinal axis of the rotor.

103. A method for creating detonative combustion in a wave rotor detonation engine comprising:
  a) rotating a rotor comprising a plurality of combustion passages disposed therein so that an inlet of a selected combustion passage is in gaseous communication with a first inlet zone of an inlet port;
  b) drawing air into the inlet from the first inlet zone, the air forming a buffer layer to inhibit combustion by any hot gases present within the selected combustion passage;
  c) rotating the rotor so that the inlet is in gaseous communication with a second inlet zone of the inlet port;
  d) introducing fuel into the second inlet zone to provide a first combustible fuel mixture, and drawing the fuel mixture into the inlet from the second inlet zone;
  e) rotating the rotor so that the inlet is substantially gaseously sealed against a first wall of the engine housing whereby the inlet is in communication with an igniter mounted at the first wall;
  f) igniting the combustible mixture within the selected combustion passage to cause detonative combustion whereby a shock wave is generated traveling from the inlet towards an outlet of the combustion passage;
  g) rotating the rotor so that the outlet is in gaseous communication with an exhaust port as the shock wave reaches the outlet, whereby an expansion wave is generated traveling from the outlet towards the inlet of the combustion passage; and
  h) rotating the rotor so that an unshrouded intermediate portion of the combustion passage is in gaseous communication with a source of bypass air as the expansion wave reaches the source of bypass air, whereby bypass air is drawn into the combustion passage.

104. The method for creating detonative combustion of claim 103 wherein the combustible mixture is formulated to enhance initiation of detonative combustion.

105. The method for creating detonative combustion of claim 103 comprising rotating the rotor so that the inlet is in gaseous communication with a third inlet zone of the inlet port, introducing a second combustible fuel mixture into the third inlet zone, and drawing the second combustible mixture into the inlet.

106. The method for creating detonative combustion of claim 103 wherein the steps are repeated sequentially for succeeding combustion passages.

* * * * *